United States Patent
Liu et al.

(10) Patent No.: US 9,713,100 B2
(45) Date of Patent: Jul. 18, 2017

(54) METHOD, SYSTEM, DATABASE, MANAGEMENT NODE, AND STORAGE MEDIUM FOR INTERFERENCE DISTRIBUTION

(71) Applicant: ZTE Corporation, Shenzhen, Guangdong (CN)

(72) Inventors: Xing Liu, Shenzhen (CN); Yan Li, Shenzhen (CN); Bin Wang, Shenzhen (CN); Ting Miao, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/889,333

(22) PCT Filed: Apr. 24, 2014

(86) PCT No.: PCT/CN2014/076111
§ 371 (c)(1),
(2) Date: Nov. 5, 2015

(87) PCT Pub. No.: WO2014/180260
PCT Pub. Date: Nov. 13, 2014

(65) Prior Publication Data
US 2016/0119882 A1     Apr. 28, 2016

(30) Foreign Application Priority Data

May 8, 2013    (CN) .......................... 2013 1 0167769

(51) Int. Cl.
*H04W 4/00*     (2009.01)
*H04W 52/24*    (2009.01)
(Continued)

(52) U.S. Cl.
CPC ....... *H04W 52/243* (2013.01); *H04L 27/0006* (2013.01); *H04W 4/24* (2013.01);
(Continued)

(58) Field of Classification Search
CPC . H04W 52/243; H04W 16/14; H04W 52/244; H04W 52/146; H04W 52/283;
(Continued)

(56) References Cited

U.S. PATENT DOCUMENTS

2011/0028170 A1*  2/2011  Sawai ................... H04W 52/16
                                                       455/501
2012/0052891 A1*  3/2012  Irnich ................. H04W 52/243
                                                       455/501
(Continued)

FOREIGN PATENT DOCUMENTS

CN         102387553 A       3/2012
CN         102412919 A       4/2012
(Continued)

OTHER PUBLICATIONS

Supplementary European Search Report in European application No. 14795478.8, mailed on Apr. 25, 2016.
(Continued)

*Primary Examiner* — Kwasi Karikari
(74) *Attorney, Agent, or Firm* — Oppedahl Patent Law Firm LLC

(57) ABSTRACT

Disclosed is a method for interference distribution. The method comprises: a reconfiguration management node of a secondary system acquires or receives information of an idle spectrum resource and information on the total interference value that the secondary system is permitted to generate on the idle spectrum resource; and, the reconfiguration management node calculates, on the basis of the information on the total interference value that the secondary system is permitted to generate, a transmission power for a secondary user equipment that is subordinate to the reconfiguration management node. While at the same time, also disclosed
(Continued)

are a system, management node, database, and storage medium for interference distribution.

16 Claims, 13 Drawing Sheets

(51) Int. Cl.
    *H04L 27/00*     (2006.01)
    *H04W 4/24*     (2009.01)
    *H04W 16/14*     (2009.01)
    *H04W 52/38*     (2009.01)

(52) U.S. Cl.
    CPC ......... *H04W 16/14* (2013.01); *H04W 52/244* (2013.01); *H04W 52/38* (2013.01)

(58) Field of Classification Search
    CPC ............. H04W 52/367; H04W 52/346; H04W 72/082; H04W 52/228; H04W 52/383; H04W 40/08; H04W 40/12; H04W 52/325; H04B 1/7103
    See application file for complete search history.

(56) References Cited

U.S. PATENT DOCUMENTS

| | | |
|---|---|---|
| 2013/0217429 A1* | 8/2013 | Kimura ................. H04W 16/14 455/509 |
| 2013/0336155 A1 | 12/2013 | Jaentti |
| 2013/0343219 A1 | 12/2013 | Kronander |
| 2014/0220901 A1* | 8/2014 | Selen .................... H04W 16/14 455/63.1 |

FOREIGN PATENT DOCUMENTS

| | | |
|---|---|---|
| CN | 103037379 A | 4/2013 |
| WO | 2012113937 A1 | 8/2012 |
| WO | 2012125088 A1 | 9/2012 |
| WO | 2013032381 A1 | 3/2013 |

OTHER PUBLICATIONS

International Search Report in international application No. PCT/CN2014/076111, mailed on Jul. 14, 2014.

English Translation of the Written Opinion of the International Search Authority in international application No. PCT/CN2014/076111, mailed on Jul. 14, 2014.

* cited by examiner

METHOD, SYSTEM, DATABASE, MANAGEMENT NODE, AND STORAGE MEDIUM FOR INTERFERENCE DISTRIBUTION

TECHNICAL FIELD

The disclosure relates to Cognitive Radio in the field of wireless communication, and in particular to an interference allocating method and system, database, managing node, and non-transitory storage medium based on a secondary system.

BACKGROUND

With the continuous improvement of radio technology, a variety of radio services spring in large numbers. There are limited radio-service-bearing spectrum resources, which are in short supply with respect to increasingly higher requirements on the bandwidths. The utilization rate of the spectrum resources is low under a conventional mode of fixed spectrum allocation. In a sense, the spectrum resource shortage is caused by such a spectrum allocating system of fixed allocation to an authorizing system. With Cognitive Radio as a break from the conventional fixed spectrum allocation system, dynamic inter-system spectrum allocation is performed, increasing a spectrum utilization rate. Simple voice data communication can no longer meet a continuously increasing daily communication requirement. A video streaming service has become a continuously increasing share of daily communication. This may require support of a larger bandwidth, such that an International Mobile Telecom (IMT) system shows an unprecedented spectrum shortage. On the other hand, for a Radio and TV system, largely there is spectrum resource space available. For example, some Radio and TV system spectra may not be put to use in some area; some Radio and TV system spectra, although covering some area, are not always put to use, leading to a low overall utilization rate. However, with fixed spectrum allocation, such unused spectrum resources cannot be re-used, such as by the IMT system. With Cognitive Radio, the IMT system may acquire information on the Radio and TV system and wait to take over spectrum resources not used by the Radio and TV system in space and time, thus increasing utilization rate of a spectrum of the Radio and TV system, improving the spectrum shortage in the IMT system. Unused spectrum resources of the Radio and TV system is referred to as a TV White Space (TVWS). A system waiting to take over a spectrum authorized to be used by another system may be referred to as a secondary system or a secondary user. A system authorized to use the spectrum may be referred to as a primary system or a primary user. Therefore, in the aforementioned scene, the Radio and TV system is a primary system, and the IMT system is a secondary system.

Network architecture of an actual Cognitive Radio system may contain three layers, namely a database (DB), a reconfiguration managing node such as a Central Control Point (CCP), and a secondary user equipment. The secondary user equipment may be a Base Station (BS), an accessing node under management, a terminal, or the like. As shown in FIG. 1, one or more reconfiguration managing nodes respectively access the database, and respectively manage secondary user equipment under respective management. The secondary system 1 may consist of the CCP1, BS1, BS2, BS3, and any terminal under management of any BS. Spectrum resource utilization may be managed by the CCP1. Multiple secondary user equipment working on a same TVWS spectrum resource produce overlapping interferences to the primary user, as shown in FIG. 2. When Cognitive Radio BSs a, b, and c simultaneously use a TVWS spectrum resource f1, a primary user A authorized to use the same frequency domain f1 will endure a superposition of interferences produced by the BSs a, b, and c. A superposition of interferences produced by the BSs a, b, and c will not impact the normal functioning of the primary user A only if it is less than an interference threshold of the primary user A. In this case, it is not enough to consider only a single secondary user equipment. A maximal transmit power for a single secondary user, computed according to a locational relation between the primary user and just the single secondary user, a propagation model, and an interference tolerance of the primary user, will be meaningless. Instead, the transmit power for the BSs a, b, c may have to be computed. It is known that a database computes the transmit power for any user equipment under management, while a reconfiguration managing node plays no role in such computation. Thus, any secondary user equipment may share the interference tolerance of the primary user. The database is configured for storing primary user spectrum resource usage information, managed by an operator of a primary system or an operator of a third party. The database may be a geo-location database.

Such management by a single node, such as when the transmit power of any secondary user equipment is computed by the database, may lead to a problem, specifically as follows.

1, it is not adapted to flexible power control among secondary system equipment. The database as a global managing node manages all secondary user equipment. Each time a secondary user equipment is added on a TVWS spectrum resource, the database may be triggered to perform TVWS spectrum resource allocation, and even transmit parameter re-adjustment for equipment in multiple secondary systems. This will impact system stability.

2, a delay may be uncontrollable. A processing delay, of the database as an entity operated by the operator of the primary system or a third party, is not controlled by a secondary system. Therefore, the overall reconfiguration process can hardly meet a service continuity requirement of a secondary system.

SUMMARY

In view of this, an embodiment herein may provide an interference allocating method and system, database, managing node, and non-transitory storage medium, capable of allowing a secondary system to perform, with a controllable configuration delay, flexible inter-equipment transmit power configuration within the range of an overall interference quota allocated.

A technical solution according to an embodiment herein may be implemented as follows.

An embodiment herein may provide an interference allocating method, including:

acquiring or receiving, by a reconfiguration managing node of a secondary system, information on an idle spectrum resource, and information on an overall interference the secondary system is allowed to produce on the idle spectrum resource;

computing, by the reconfiguration managing node according to the information on the overall interference the secondary system is allowed to produce, a transmit power for a secondary user equipment under management of the reconfiguration managing node.

The acquiring or receiving, by the reconfiguration managing node, the information on the idle spectrum resource and the information on the overall interference the secondary system is allowed to produce on the idle spectrum resource may include:

acquiring or receiving, by the reconfiguration managing node from a database configured for storing primary user spectrum resource usage information, the information on the idle spectrum resource and the information on the overall interference the secondary system is allowed to produce on the idle spectrum resource.

The information on the idle spectrum resource may include:

information on an idle spectrum resource of a primary user allowed to be configured for the secondary system within the range of idle spectrum resources expected to be configured for the secondary system. The information on the idle spectrum resource may include at least one of:

a frequency, a bandwidth, an idle duration, coverage edge information, protection band information, an interference tolerance threshold.

The information on the overall interference the secondary system is allowed to produce on the idle spectrum resource may include:

a maximal overall interference any network element using the idle spectrum resource in the secondary system is allowed to produce on a coverage edge of a primary user.

The method may further include:

computing, by the database according to the interference tolerance threshold of the primary user on the idle spectrum resource and an interference already produced on the coverage edge of the primary user, a further interference tolerable to the primary user; or allocating, by the database according to the interference tolerance threshold of the primary user and/or the further interference tolerable to the primary user, and according to the nature of any secondary system, an overall interference the any secondary system is allowed to produce. The overall interference the any secondary system is allowed to produce may accumulate to give the further interference tolerable to the primary user.

The interference already produced may include an interference to the primary user produced by a secondary system working on the idle spectrum and/or an interference to the primary user produced by a secondary system working on a frequency adjacent to the idle spectrum.

The method may further include:

obtaining, by the database by computing the overall interference on the idle spectrum resource allocated to any secondary system, the interference already produced; or obtaining, by the database from feedback on an actual interference produced by a secondary system, the interference already produced; or obtaining, by the database by sensing and measuring an actual interference on the idle spectrum resource, the interference already produced.

The nature of a secondary system may include at least one of: historical interference information, payment information, priority information, and a transmit parameter requirement of the secondary system.

The transmit parameter requirement may be information related to weighing an actual transmit power requirement of the secondary system on the idle spectrum resource. The transmit parameter requirement may be obtained when the reconfiguration managing node collects a spectrum resource request of a secondary user equipment under management. The transmit parameter requirement may include a number of Base Stations (BS) issuing a resource request and/or a locational distribution of BSs issuing a resource request and/or a transmit power level of any BS and/or an overall transmit power requirement of any BS.

The priority information may be a priority level for system power allocation predetermined by a Cognitive Radio system and/or an operator;

The payment information may be information on a fee paid by the secondary system for using the idle spectrum resource;

The historical interference information may be information on historical interference to the primary user produced by the secondary system when previously using the idle spectrum resource.

The allocating, by the database according to the interference tolerance threshold of the primary user and/or the further interference tolerable to the primary user, and according to the nature of any secondary system, an overall interference the any secondary system is allowed to produce may include:

allocating, by the database according to the transmit parameter requirement and/or the priority information and/or the payment information and/or the historical interference information of any secondary system, an interference weight to the any secondary system by: allocating a large interference weight to a secondary system with a large transmit parameter requirement and/or a high priority level and/or a high fee payment and/or a small historical interference to allow the secondary system to produce a large interference, and allocating a small interference weight to a secondary system with a small transmit parameter requirement and/or a low priority level and/or a low fee payment and/or a large historical interference to allow the secondary system to produce a small interference;

obtaining, by the database, the overall interference the any secondary system is allowed to produce by determining, according to the interference weight, a ratio of the overall interference the any secondary system is allowed to produce to the interference tolerance threshold of the primary user and/or the further interference tolerable to the primary user.

The computing, by the reconfiguration managing node according to the information on the overall interference the secondary system is allowed to produce, a transmit power for a secondary user equipment under management may include:

when an interference on the coverage edge of the primary user produced by the secondary user equipment reaches the overall interference, computing the transmit power of the secondary user equipment as a maximal transmit power the secondary user equipment is allowed to have according to location coordinates of the secondary user equipment under management, location coordinates of the coverage edge of the primary user, and a propagation model; or when multiple secondary user equipment under management of the reconfiguration managing node simultaneously use the idle spectrum resource, and an interference on the coverage edge of the primary user produced by the multiple secondary user equipment working simultaneously reaches the overall interference, computing a transmit power of each of the multiple secondary user equipment.

The computing, by the reconfiguration managing node according to the information on the overall interference the secondary system is allowed to produce, a transmit power for a secondary user equipment under management may include:

adjusting, by the reconfiguration managing node according to the change in the overall interference the secondary system is allowed to produce, a transmit power of a secondary user equipment under management; or determining, by the reconfiguration managing node, a transmit power for a secondary user equipment having recently joined the secondary system; or optimizing, by the reconfiguration managing node, a transmit power of a secondary user equipment.

The secondary user equipment may include a Base Stations (BS) and/or an accessing node.

The reconfiguration managing node may compute the transmit power for the secondary user equipment under management by computing a maximal transmit power any secondary user equipment under management is allowed to have; or the reconfiguration managing node may provide information on a maximal transmit power allowed for a BS of the secondary system, and then the BS of the secondary system allocates a transmit power for an accessing node under management of the BS.

The adjusting, by the reconfiguration managing node according to the change in the overall interference the secondary system is allowed to produce, a transmit power of a secondary user equipment under management may include:

adjusting, by the reconfiguration managing node according to increase or decrease of the overall interference the secondary system is allowed to produce on an idle spectrum resource, the transmit power for the secondary user equipment under management, including:

proportionally increasing or decreasing the transmit power of any secondary user equipment under management working on the idle spectrum resource according to a ratio of the increase or decrease of the overall interference the secondary system is allowed to produce;

or increasing or decreasing the transmit power of some secondary user equipment;

or increasing a number of secondary user equipment working on the idle spectrum resource, or reducing a number of secondary user equipment working on the idle spectrum resource.

The determining the transmit power for the secondary user equipment having recently joined the secondary system may include:

when the secondary user equipment having recently joined the secondary system starts up, computing, by the reconfiguration managing node, an interference the secondary user equipment having recently joined the secondary system is allowed to produce according to the acquired overall interference the secondary system is allowed to produce on the idle spectrum resource, information on a coverage edge of a primary user corresponding to the idle spectrum resource, and interference already produced on the idle spectrum on the coverage edge of the primary user by any user equipment in the secondary system other than the secondary user equipment having recently joined the secondary system; and computing a maximal transmit power the secondary user equipment having recently joined the secondary system is allowed to have according to locational information of the secondary user equipment having recently joined the secondary system and a propagation model between the secondary user equipment having recently joined the secondary system and the coverage edge of the primary user.

The optimizing, by the reconfiguration managing node, a transmit power of a secondary user equipment may include:

adjusting, by the reconfiguration managing node based on a change in the transmit power of any secondary user equipment in the secondary system, the transmit power for the any secondary user equipment within the range of the overall interference the secondary system is allowed to produce.

An embodiment herein may further provide an interference allocating system, including a reconfiguration managing node and a secondary user equipment under management of the reconfiguration managing node. The reconfiguration managing node may be located in a secondary system.

The reconfiguration managing node may be configured for: acquiring or receiving information on an idle spectrum resource, and information on an overall interference the secondary system is allowed to produce on the idle spectrum resource; and computing, according to the information on the overall interference the secondary system is allowed to produce, a transmit power for the secondary user equipment under management of the reconfiguration managing node.

The system may further include a database configured for storing primary user spectrum resource usage information.

The reconfiguration managing node may be further configured for: acquiring or receiving, from the database, the information on the idle spectrum resource and the information on the overall interference the secondary system is allowed to produce on the idle spectrum resource.

The information on the idle spectrum resource may include at least one of: a frequency, a bandwidth, an idle duration, coverage edge information, protection band information, an interference tolerance threshold.

The database may be configured for: computing, according to the interference tolerance threshold of the primary user on the idle spectrum resource and an interference already produced on the coverage edge of the primary user, a further interference tolerable to the primary user; or allocating, according to the interference tolerance threshold of the primary user and/or the further interference tolerable to the primary user, and according to the nature of any secondary system, an overall interference the any secondary system is allowed to produce. The overall interference the any secondary system is allowed to produce may accumulate to give the further interference tolerable to the primary user.

The database may be further configured for: obtaining, by computing the overall interference on the idle spectrum resource allocated to any secondary system, the interference already produced; or obtaining, from feedback on an actual interference produced by a secondary system, the interference already produced; or obtaining, by sensing and measuring an actual interference on the idle spectrum resource, the interference already produced.

A nature of a secondary system may include at least one of: historical interference information, payment information, priority information, and a transmit parameter requirement of the secondary system.

The database may be configured for allocating, according to the interference tolerance threshold of the primary user and/or the further interference tolerable to the primary user, and according to the nature of any secondary system, an overall interference the any secondary system is allowed to produce by:

allocating, according to the transmit parameter requirement and/or the priority information and/or the payment information and/or the historical interference information of any secondary system, an interference weight to the any secondary system by: allocating a large interference weight to a secondary system with a large transmit parameter requirement and/or a high priority level and/or a high fee payment and/or a small historical interference to allow the secondary system to produce a large interference, and allocating a small interference weight to a secondary system with a small transmit parameter requirement and/or a low priority level and/or a low fee payment and/or a large historical interference to allow the secondary system to produce a small interference; and obtaining the overall interference the any secondary system is allowed to produce by determining, according to the interference weight, a ratio of the overall interference the any secondary system is allowed to produce to the interference tolerance threshold of the primary user and/or the further interference tolerable to the primary user.

The reconfiguration managing node may be configured for computing, according to the information on the overall interference the secondary system is allowed to produce, a transmit power for a secondary user equipment under management, including:

when an interference on the coverage edge of the primary user produced by the secondary user equipment reaches the overall interference, computing the transmit power of the secondary user equipment as a maximal transmit power the secondary user equipment is allowed to have according to location coordinates of the secondary user equipment under management, location coordinates of the coverage edge of the primary user, and a propagation model; or when multiple secondary user equipment under management of the reconfiguration managing node simultaneously use the idle spectrum resource, and an interference on the coverage edge of the primary user produced by the multiple secondary user equipment working simultaneously reaches the overall interference, computing a transmit power of each of the multiple secondary user equipment.

The reconfiguration managing node may be configured for computing, according to the information on the overall interference the secondary system is allowed to produce, a transmit power for a secondary user equipment under management, including:

adjusting, according to the change in the overall interference the secondary system is allowed to produce, a transmit power of a secondary user equipment under management; or determining a transmit power for a secondary user equipment having recently joined the secondary system; or optimizing a transmit power of a secondary user equipment.

An embodiment herein may further provide a database as described above.

An embodiment herein may further provide a managing node, which may be located in a secondary system. The managing node may include an acquiring module and a computing module.

The acquiring module may be configured for: acquiring or receiving information on an idle spectrum resource, and information on an overall interference the secondary system is allowed to produce on the idle spectrum resource.

The computing module may be configured for: computing, according to the information on the overall interference the secondary system is allowed to produce, a transmit power for the secondary user equipment under management of the reconfiguration managing node.

An embodiment herein may further provide a non-transitory computer storage medium, which may store computer-executable instructions for executing the interference allocating method.

Embodiments herein may provide an interference allocating method and system, database, managing node, and non-transitory storage medium. With the method, a reconfiguration managing node of a secondary system acquires or receives information on an idle spectrum resource, and information on an overall interference the secondary system is allowed to produce on the idle spectrum resource; the reconfiguration managing node may compute, according to the information on the overall interference the secondary system is allowed to produce, a transmit power for a secondary user equipment under management of the reconfiguration managing node. Therefore, with an embodiment herein, a secondary system may perform, within the range of an overall interference quota allocated to the secondary system by a database, flexible transmit power allocation adjustment among secondary user equipment under management according to information on an overall interference the secondary system is allowed to produce on an idle spectrum resource. A transmit power of a secondary user equipment under management may be adjusted according to a change in the overall interference the secondary system is allowed to produce. The transmit power may be determined for a secondary user equipment having recently joined a secondary system. The transmit power of a secondary user equipment may be optimized. Therefore, an embodiment herein may decrease the range impacted by secondary system equipment reconfiguration, increasing system stability.

The interference allocating method according to an embodiment herein may require no involvement of an operator of the primary system or a third party. Therefore, the delay in spectrum resource reconfiguration may be highly controllable.

DETAILED DESCRIPTION

According to an embodiment herein, a reconfiguration managing node of a secondary system acquires or receives information on an idle spectrum resource, and information on an overall interference the secondary system is allowed to produce on the idle spectrum resource; the reconfiguration managing node may compute, according to the information on the overall interference the secondary system is allowed to produce, a transmit power for a secondary user equipment under management of the reconfiguration managing node.

The disclosure is further elaborated below with reference to drawings and embodiments.

Figure 1:
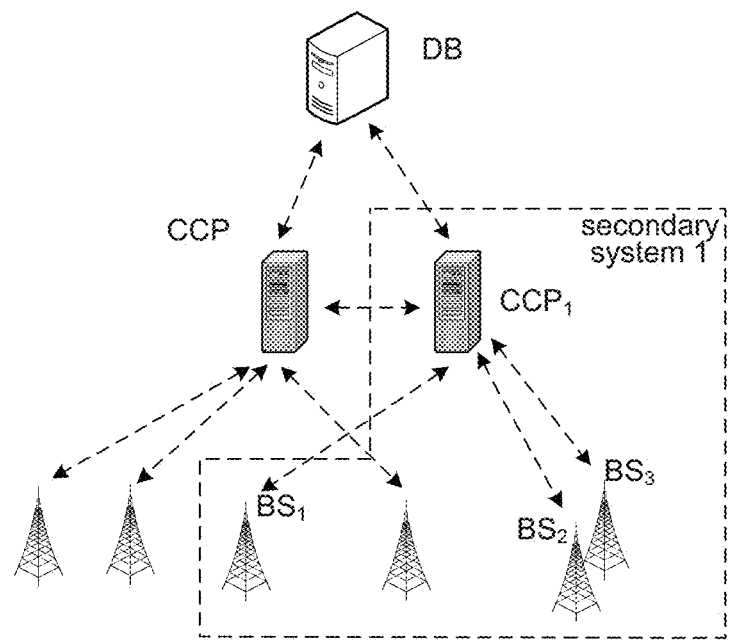
FIG. 1 is a diagram of network architecture of a Cognitive Radio system.
Figure 2:
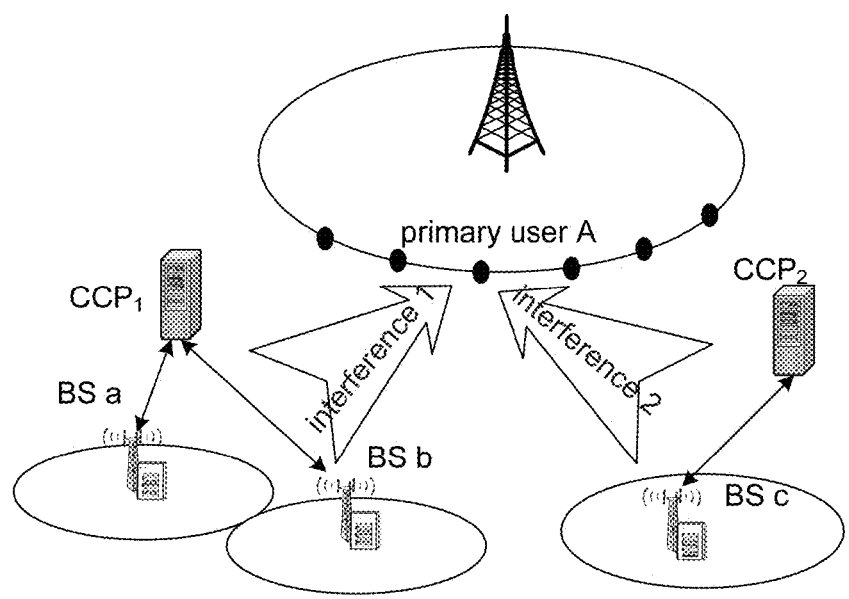
FIG. 2 is a diagram of a scene in which multiple secondary user equipment interfere with a primary user according to an embodiment.
Figure 3:
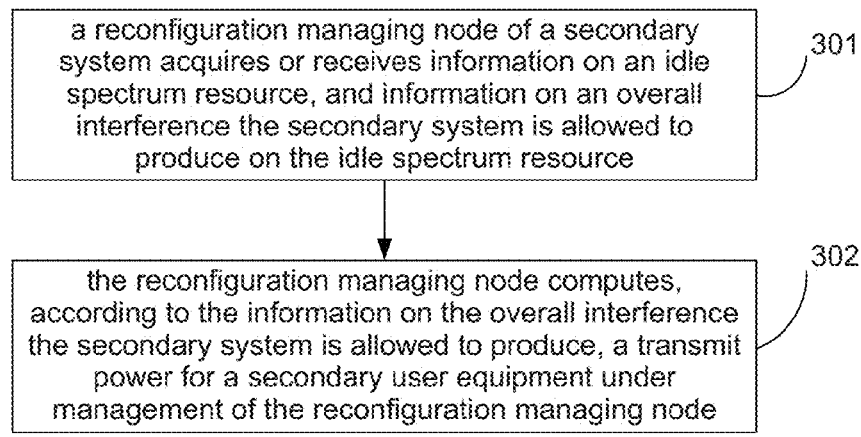
FIG. 3 is a flowchart of an interference allocating method based on a secondary system according to an embodiment herein.

FIG. 3 is a flowchart of an interference allocating method based on a secondary system according to an embodiment herein. As shown in FIG. 3, the method may include steps as follows.

In step 301, a reconfiguration managing node of a secondary system acquires or receives information on an idle spectrum resource, and information on an overall interference the secondary system is allowed to produce on the idle spectrum resource.

The reconfiguration managing node may acquire or receive, from a database configured for storing primary user spectrum resource usage information, the information on the idle spectrum resource and the information on the overall interference the secondary system is allowed to produce on the idle spectrum resource.

The reconfiguration managing node of the secondary system may be a physical entity or a logical entity based on radio accessing technology or an operator configured for: formulating a spectrum resource reconfiguration strategy within the range of the operator or the radio accessing technology, and/or reconfiguring a spectrum resource of a secondary user equipment.

The information on the idle spectrum resource may be information on an idle spectrum resource of a primary user allowed to be configured for the secondary system within the range of idle spectrum resources expected to be configured for the secondary system. The information on the idle spectrum resource may include at least one of:

a frequency, a bandwidth, an idle duration, coverage edge information, protection band information, an interference tolerance threshold.

The information on the overall interference the secondary system is allowed to produce on the idle spectrum resource may be a maximal overall interference any network element using the idle spectrum resource in the secondary system is allowed to produce on a coverage edge of a primary user.

The method may further include steps as follows.

The database may compute, according to the interference tolerance threshold of the primary user on the idle spectrum resource and an interference already produced on the coverage edge of the primary user, a further interference tolerable to the primary user.

Alternatively, a database may allocate, according to the interference tolerance threshold of the primary user and/or the further interference tolerable to the primary user, and according to the nature of any secondary system, an overall interference the any secondary system is allowed to produce. The overall interference the any secondary system is allowed to produce may accumulate to give the further interference tolerable to the primary user.

The interference already produced may include an interference to the primary user produced by a secondary system working on the idle spectrum and/or an interference to the primary user produced by a secondary system working on a frequency adjacent to the idle spectrum.

The method may further include steps as follows.

The database may obtain, by computing the overall interference on the idle spectrum resource allocated to any secondary system, the interference already produced. Alternatively, the database may obtain, from feedback on an actual interference produced by a secondary system, the interference already produced. Alternatively, the database may obtain, by sensing and measuring an actual interference on the idle spectrum resource, the interference already produced.

A nature of a secondary system may include at least one of: historical interference information, payment information, priority information, and a transmit parameter requirement of the secondary system.

The transmit parameter requirement may be information related to weighing an actual transmit power requirement of the secondary system on the idle spectrum resource, which may be obtained when the reconfiguration managing node collects a spectrum resource request of a secondary user equipment under management. The transmit parameter requirement may include a number of Base Stations (BS) issuing a resource request and/or a locational distribution of BSs issuing a resource request and/or a transmit power level of any BS and/or an overall transmit power requirement of any BS.

The priority information may be a priority level for system power allocation predetermined by a Cognitive Radio system and/or an operator.

The payment information may be information on a fee paid by the secondary system for using the idle spectrum resource.

The historical interference information may be information on historical interference to the primary user produced by the secondary system when previously using the idle spectrum resource.

The database may allocate, according to the interference tolerance threshold of the primary user and/or the further interference tolerable to the primary user, and according to the nature of any secondary system, an overall interference the any secondary system is allowed to produce as follows.

The database may allocate, according to the transmit parameter requirement and/or the priority information and/or the payment information and/or the historical interference information of any secondary system, an interference weight to the any secondary system. The database may allocate a large interference weight to a secondary system with a large transmit parameter requirement and/or a high priority level and/or a high fee payment and/or a small historical interference to allow the secondary system to produce a large interference. The database may allocate a small interference weight to a secondary system with a small transmit parameter requirement and/or a low priority level and/or a low fee payment and/or a large historical interference to allow the secondary system to produce a small interference.

The database may obtain the overall interference the any secondary system is allowed to produce by determining, according to the interference weight, a ratio of the overall interference the any secondary system is allowed to produce to the interference tolerance threshold of the primary user and/or the further interference tolerable to the primary user.

In step 302, the reconfiguration managing node may compute, according to the information on the overall interference the secondary system is allowed to produce, a transmit power for a secondary user equipment under management of the reconfiguration managing node.

When an interference on the coverage edge of the primary user produced by the secondary user equipment reaches the overall interference, the reconfiguration managing node may compute the transmit power of the secondary user equipment according to location coordinates of the secondary user equipment under management, location coordinates of the coverage edge of the primary user, and a propagation model. The transmit power of the secondary user equipment may be a maximal transmit power the secondary user equipment is allowed to have.

Alternatively, when multiple secondary user equipment under management of the reconfiguration managing node simultaneously use the idle spectrum resource, and an interference on the coverage edge of the primary user produced by the multiple secondary user equipment working simultaneously reaches the overall interference, the reconfiguration managing node may compute a transmit power of each of the multiple secondary user equipment.

The reconfiguration managing node may compute, according to the information on the overall interference the secondary system is allowed to produce, a transmit power for a secondary user equipment under management as follows.

The reconfiguration managing node may adjust, according to the change in the overall interference the secondary system is allowed to produce, a transmit power of a secondary user equipment under management. Alternatively, the reconfiguration managing node may determine a transmit power for a secondary user equipment having recently joined the secondary system. Alternatively, the reconfiguration managing node may optimize a transmit power of a secondary user equipment.

The secondary user equipment may include a Base Stations (BS) and/or an accessing node.

The reconfiguration managing node may compute the transmit power for the secondary user equipment under management as follows. The reconfiguration managing node may compute a maximal transmit power any secondary user equipment under management is allowed to have. Alternatively, the reconfiguration managing node may provide information on a maximal transmit power allowed for a BS of the secondary system. Then, the BS of the secondary system may allocate a transmit power for an accessing node under management of the BS.

The reconfiguration managing node may adjust, according to the change in the overall interference the secondary system is allowed to produce, a transmit power of a secondary user equipment under management as follows.

The reconfiguration managing node may adjust, according to increase or decrease of the overall interference the secondary system is allowed to produce on an idle spectrum resource, the transmit power for the secondary user equipment under management, which may be specifically as follows.

The reconfiguration managing node may proportionally increase or decrease the transmit power of any secondary user equipment under management working on the idle spectrum resource according to a ratio of the increase or decrease of the overall interference the secondary system is allowed to produce.

Alternatively, the reconfiguration managing node may increase or decrease the transmit power of some secondary user equipment. Alternatively, the reconfiguration managing node may increase a number of secondary user equipment working on the idle spectrum resource. Alternatively, the reconfiguration managing node may reduce a number of secondary user equipment working on the idle spectrum resource.

The transmit power for a secondary user equipment having recently joined the secondary system may be determined as follows.

When a secondary user equipment having recently joined the secondary system starts up, the reconfiguration managing node may compute an interference the secondary user equipment having recently joined the secondary system is allowed to produce according to the acquired overall interference the secondary system is allowed to produce on the idle spectrum resource, information on a coverage edge of a primary user corresponding to the idle spectrum resource, and interference already produced on the idle spectrum on the coverage edge of the primary user by any user equipment in the secondary system other than the secondary user equipment having recently joined the secondary system. The reconfiguration managing node may compute a maximal transmit power the secondary user equipment having recently joined the secondary system is allowed to have according to locational information of the secondary user equipment having recently joined the secondary system and a propagation model between the secondary user equipment having recently joined the secondary system and the coverage edge of the primary user.

The reconfiguration managing node may optimize a transmit power of a secondary user equipment by adjusting, based on a change in the transmit power of any secondary user equipment in the secondary system, the transmit power for the any secondary user equipment within the range of the overall interference the secondary system is allowed to produce.

The method herein may be elaborated below with reference to an embodiment herein.

First Embodiment

Figure 4:
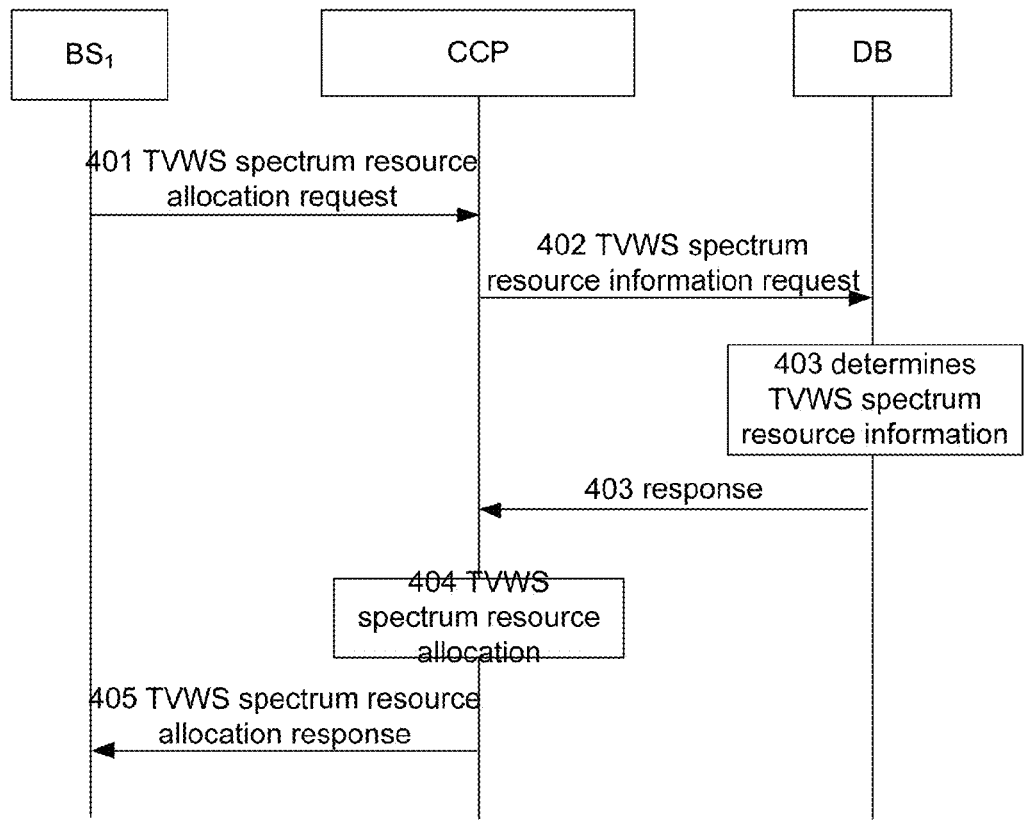
FIG. 4 is a signaling flowchart of an interference allocating method based on a secondary system according to a first embodiment herein.

When no secondary system is working on a target TVWS spectrum, a reconfiguration managing node of a secondary system may allocate, for a BS under management thereof, a solution for determining the power for the TVWS spectrum resource. A CCP may serve as the reconfiguration managing node for illustrative purpose. A detailed flow may be as shown in FIG. 4, and is elaborated as follows.

In step 401, a BS1 may initiate a TVWS spectrum resource request to a Central Control Node (CCP) of a secondary system managing the BS1.

BS1 may send locational information per se, and related capability or resource requirement information such as a supported working frequency range 470-560 MHz, a bandwidth 5 MHz, an expected transmit power 30 dBm, or the like, to the CCP.

In step 402, the CCP may send a TVWS spectrum resource request to a database.

In step 403, the database may feed, back to the CCP, idle spectrum resource information (that is, information on any idle spectrum resource), and information on a maximal interference Imax allowed to be produced thereby (here the Imax on the any idle spectrum resource produced by the CCP).

The database may search any TVWS spectrum resource in the range including BS1 for an idle working frequency f1=503 MHz with a bandwidth 5 MHz, and allocate found resource to the CCP. According to a record of the database, no other secondary system is using the resource allocated. Therefore, the fed back maximal allowed interference Imax may be an interference tolerance threshold −80 dBm, and may be sent to the CCP together with corresponding primary user coverage information.

In step 404, the CCP may allocate, according to the acquired information, a resource for BS1 under management issuing the resource request, and may provide a maximal transmit power.

The CCP may select, according to location coordinates in the primary user coverage information, a reference point (namely a point on the coverage edge where the resource-applying BS produces a maximal interference) and the location coordinates of the resource-applying BS1 as well as a transmission model in between. The CCP may compute, when an interference at the reference point reaches −80 dBm, the transmit power of BS1 to be 40 dBm (using known formula and process, for example). Thus, 40 dBm is the maximal transmit power allowed for BS1. The resource allocated can meet the transmit power requirement of BS1. Therefore, the resource may be suitable for being used by BS1.

In step 405, the CCP may send BS1 a resource allocating message, including the determined frequency 503 MHz, the bandwidth 5 MHz, the transmit power 30 dBm, accomplishing the spectrum resource allocating flow.

Second Embodiment

Figure 5:
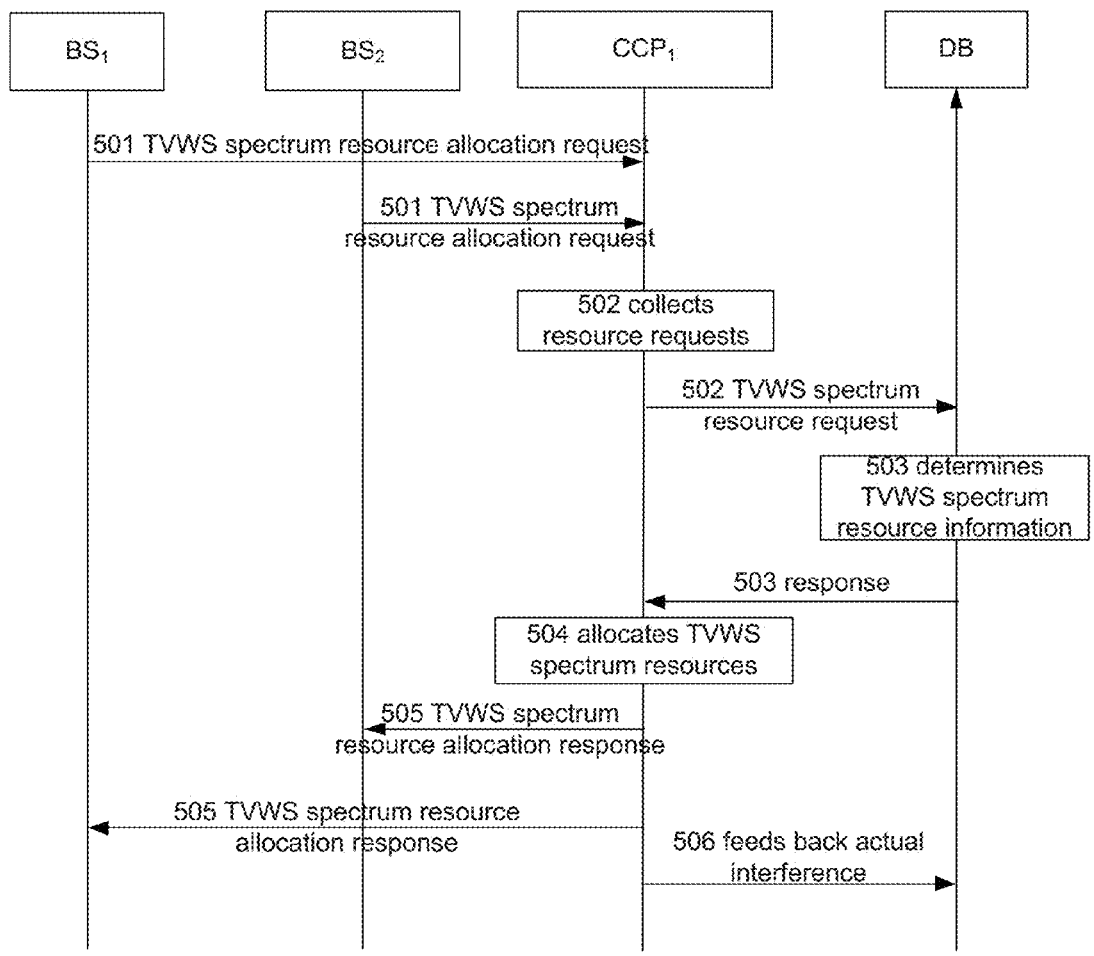
FIG. 5 is a signaling flowchart of an interference allocating method based on a secondary system according to a second embodiment herein.

In case that a secondary system is working on a target TVWS spectrum, a reconfiguration managing node of a secondary system may allocate, for a BS under management thereof, a solution for determining the power for the TVWS spectrum resource. Here, after collecting any resource request of any BS under management within a period of time, the reconfiguration managing node of the secondary system may initiate a collective resource request to a database. A detailed flow, as shown in FIG. 5, is elaborated as follows.

In step 501, a BS1 and a BS2 may successively initiate a TVWS spectrum resource request to a CCP1 of a secondary system managing the BSs.

The BSs may respectively report related information, such that the CCP1 may allocate any proper resource. BS1 may send locational information per se, and related capability or resource requirement information such as a working frequency range 470-560 MHz supported by BS1, a bandwidth 5 MHz, and an expected transmit power 40 dBm, or the like, to the CCP1; BS2 may send locational information per se, and related capability or resource requirement information such as a working frequency range 470-560 MHz supported by BS2, a bandwidth 5 MHz, and an expected transmit power 30 dBm, or the like, to the CCP1.

In step 502, the CCP1 may collect any resource request of any BS, and may send a TVWS spectrum resource request to a database.

The CCP1 may collect any resource request of any BS under management within a pre-configured time interval such as a period of ten minutes. Any resource request collected may be recorded by the CCP1. The CCP1 may send, at the end of the ten-minute period, the database a collective TVWS spectrum resource request. Information the CCP1 sends to the database may contain but not limited to: locations of BS1, BS2, the expected transmit power, the supported working frequency range 470-560 MHz, and the working bandwidth 5 MHz.

In step 503, the database may feed, back to the CCP1, idle spectrum resource information and information on a maximal interference Imax allowed to be produced thereby.

The database may search any TVWS spectrum resource in the range including CCP1 for an idle working frequency f1=503 MHz with a bandwidth 5 MHz, and allocate found resource to the CCP1. According to a record of the database, another secondary system CCP2 is using the resource allocated to CCP1. Therefore, the database may feed back primary user protection information, namely primary user coverage information, as well as the maximal interference allowed, which may be Imax =−62.2 dBm obtained by the interference tolerance threshold of the primary user −60 dBm minus an interference −64 dBm already produced by the CCP2: −62.2 dBm=−60 dBm −(−64 dBm).

In step 504, the CCP1 may allocate, according to the acquired information on the idle spectrum resource, and information on a maximal interference Imax allowed to be produced by CCP1, a resource for the BS under management issuing the resource request, and may provide a maximal transmit power.

The CCP1 may select, according to location coordinates in the primary user coverage information, a reference point (namely a point on the coverage edge where the resource-applying BS produces a maximal interference) and the location coordinates of the resource-applying BS1 and BS2 as well as any transmission model involved. The CCP may compute, when the two BSs transmit with respective expected transmit power, interference at the reference point of −63 dBm. Therefore, the spectrum resource allocated may meet the requirement of the CCP1. The two BSs may transmit with the respective expected transmit power.

In step 505, the CCP1 may respectively send BS1 and BS2 a resource allocating message, including the determined frequency 503 MHz, the bandwidth 5 MHz, the respective transmit power 40 dBm, 30 dBm.

In step 506, CCP1 may send the database the information on the interference actual produced by the secondary system of the CCP1, namely I=−63 dBm, accomplishing the spectrum resource allocating flow.

here, the reconfiguration managing node of the secondary system may collect any resource request information within a pre-configured period. Alternatively, such collection operation may also be controlled by the reconfiguration managing node flexibly. For example, it may be specified that a resource request may be initiated to the database upon receiving a number n of BS resource requests. The n=1, 2, 3 . . . , N, N being an integer.

Third Embodiment

Figure 6:
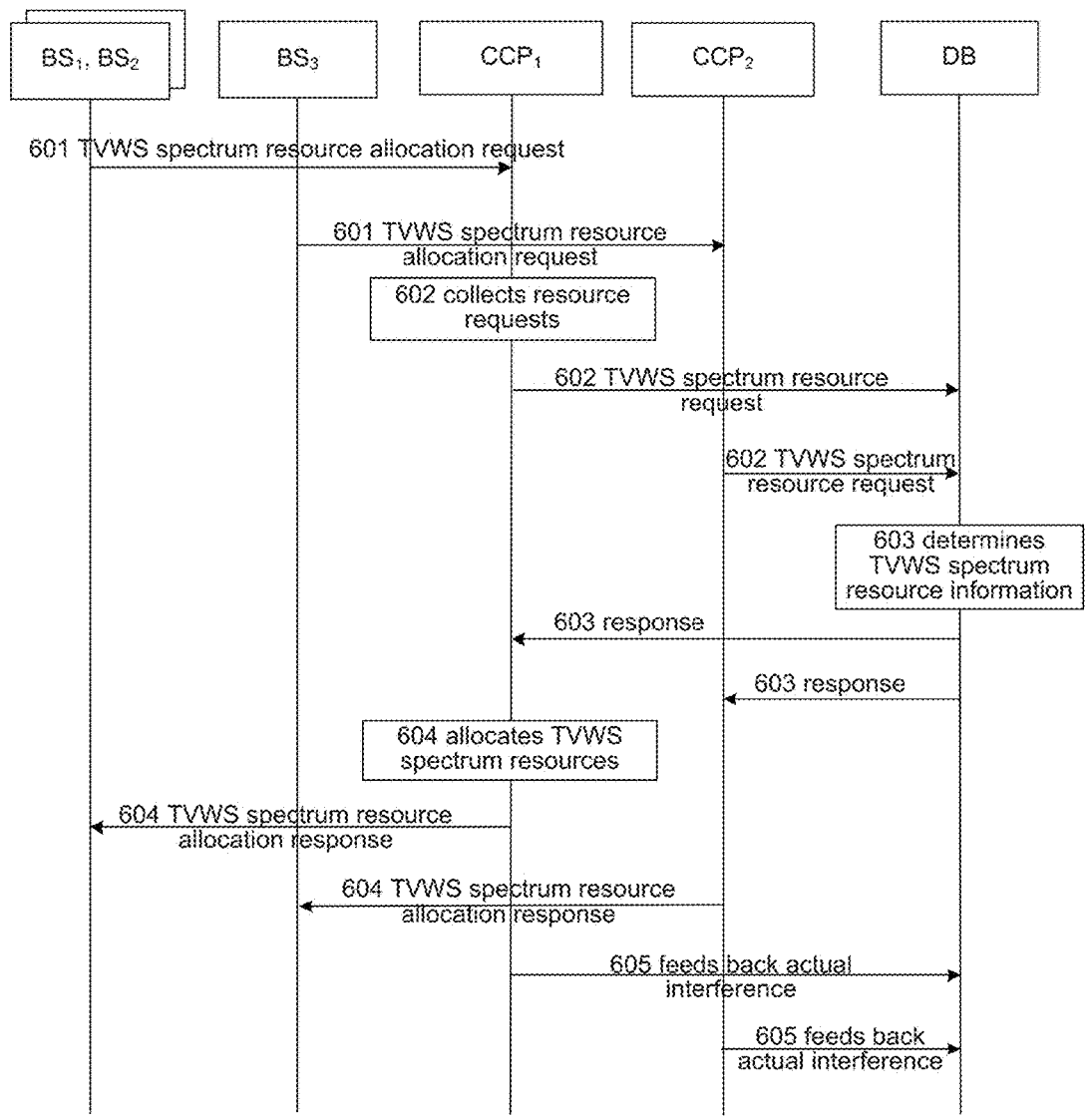
FIG. 6 is a signaling flowchart of an interference allocating method based on a secondary system according to a third embodiment herein.

When multiple secondary systems are simultaneously using a same TVWS spectrum resource, a database may allocate for the multiple secondary systems, based on a nature of a secondary system, a solution for allowing interference. Such a signaling flow may be as shown in FIG. 6, and is elaborated as follows.

In step 601, BS1, BS2, and BS3 may send a spectrum resource request respectively to reconfiguration managing nodes CCP1 and CCP2 of secondary systems respectively managing the BSs.

The BSs may respectively report related information, such that the CCPs may allocate any proper resource. BS1 and BS2 may be under the management of the CCP1. BS1 and BS2 may send the CCP2 respective locational information of the BSs, and related capability or resource requirement information such as a supported working frequency range 470-560 MHz, a bandwidth 5 MHz, an expected transmit power 40 dBm, or the like. BS3 may send locational information per se, and related capability or resource requirement information such as a supported working frequency range 470-560 MHz, a bandwidth 5 MHz, an expected transmit power 30 dBm, or the like, to the CCP2.

In step 602, CCP1 and CCP2 may respectively send a resource request to a database.

The any resource request sent by CCP1 or CCP2 to the database may contain the nature of a requested resource, a supported working frequency range 470-560 MHz, a bandwidth 5 MHz, and any parameter facilitating interference allocation by the database. A request from CCP1 may include a BS number of 2, a transmit power level of 40 dBm*2, and locational distribution information. A request from CCP2 may include a BS number of 1, a transmit power level of 30 dBm, and locational distribution information.

In step 603, the database may perform system allocation of allowed interference.

The database first may check any TVWS spectrum resource in an area including a resource-applying BS. A spectrum of a central frequency $f1=503$ MHz and a bandwidth 6 MHz may be idle and available. An interference tolerance threshold may be $-80$ dBm. The database may allocate an interference weight respectively to each secondary system according to information provided by CCP1 and CCP2. Given a TVWS transmit requirement of each system as well as a BS number, a transmit power level, and locational distribution of a secondary system, the database may allocate $Imax_1=-82.2$ dBm for CCP1 and $Imax_2=-84$ dBm for CCP2. The database may feed allocated interference allowance together with related TVWS information and coverage information back to a corresponding CCP.

In step 604, CCP1 and CCP2 may respectively compute the transmit power for a BS under respective management, and send a final allocation to the BS.

Take CCP1 as an example. Both BS1 and BS2 may perform transmitting with the expected transmit power thereof. Computation using a path loss model may give, at a reference point, an overall interference $-80.5$ dBm and a maximal allowed interference of $-82.2$ dBm. This cannot meet the expected transmit power requirement of the two BSs. In this case, the transmit power of both BSs may be cut down proportionally. $-80.5$ dBm $=9*10^{-9}$ W, $-82.2$ dBm$=6*10^{-9}$ W. Thus, the transmit power BS1 and BS2 are allowed to have may be $(6*10^{-9})/(9*10^{-9})*40$ dBm$=26.7$ dBm.

In such a case in which only transmit requirement of some BSs under management of a CCP is met, the CCP may allocate the spectrum to just one BS under management of the CCP. For example, the resource may be allocated to BS1, such that BS1 may perform transmitting with the expected transmit power. No idle resource may be allocated to BS2.

Similarly, the CCP2 may compute the transmit power for BS3 and determine that BS3 may perform transmitting with the expected transmit power thereof.

In step 605, CCP1 and CCP2 may respectively feed actual interference produced by any BS under management configured with the TVWS spectrum resource back to the database.

In step 603, when allocating interference weights for CCP1 and CCP2, the database may consider only the transmit parameter requirement of a system. In addition to a system transmit parameter requirement, the basis for interference weight allocation may further include a system priority. In TVWS spectrum resource leasing, a system may have to pay a primary user system for a borrowed TVWS. Thus, a payment amount may be another basis for interference allocation. Namely, when requesting a TVWS spectrum resource before the database, the CCP may provide a corresponding rate. The database may allocate an interference weight to a CCP according to a payment situation of the CCP. The higher the payment, the higher interference weight a system may get.

The CCP1 may pay a rate of ¥50,000 per hour for a TVWS spectrum resource of 5 MHz. The CCP2 may pay a rate of ¥25,000 per hour for the same TVWS spectrum resource. In case that any other factor is identical for both CCPs, given priorities based on the system payments, the database may determine the interference weight ratio to be CCP1:CCP2=2:1. Namely, ⅔ of the overall interference may be allocated to CCP1, and ⅓ to CCP2.

Fourth Embodiment

Figure 7:
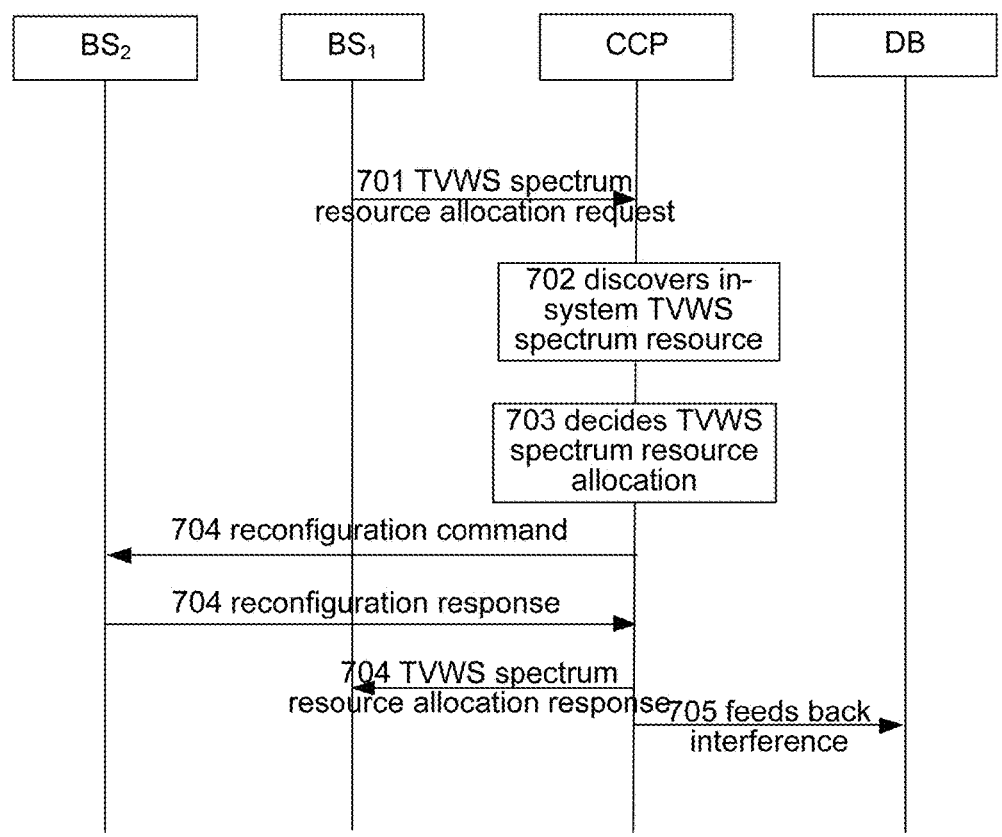
FIG. 7 is a signaling flowchart of an interference allocating method based on a secondary system according to a fourth embodiment herein.

A BS1 may be added to a TVWS spectrum resource on which the secondary system BS2 is working. A reconfiguration managing node may adjust the transmit power for any BS within the system. Such a signaling flow may be as shown in FIG. 7, and is elaborated as follows.

In step 701, a BS1 may issue a TVWS spectrum resource request to a reconfiguration managing node CCP of a secondary system managing the BS1.

BS1 may send locational information per se, and related capability or resource requirement information such as a supported working frequency range 470-560 MHz, a bandwidth 5 MHz, an expected transmit power 30 dBm, or the like, to the CCP.

In step 702, CCP may discover any TVWS spectrum resource within the system.

The CCP may search any TVWS spectrum resource being used by BS2 within the system, and may discover that an upper limit of interference tolerance allocated by a database has not been reached for a resource f1. Previously, the database allocated the resource f1 to the CCP with an allowed interference Imax=$-60$ dBm. An actual interference produced by BS2 within the system has reached the upper limit $-60$ dBm. However, a current actual load state of BS2 has lowered and BS2 no longer needs the resource f1. Therefore, the spectrum resource f1 originally configured to BS2 may now be configured to BS1.

In step 703, CCP may reallocate the previously allocated TVWS spectrum resource.

When BS1 performs transmitting with an expectation power, according to the location of BS1 and a path loss model, an interference of $-64$ dBm produced at a reference point of a protection band of a primary user may be computed, which is less than the remaining interference tolerance, which says that TVWS may be used by BS1 with the expected power.

In step 704, CCP may send a command to BS2 for releasing the spectrum resource f1, and send a configuration command to BS1.

In step 705, CCP may feed, back to the database, an actual interference produced, I=$-64$ dBm.

Fifth Embodiment

Figure 8:
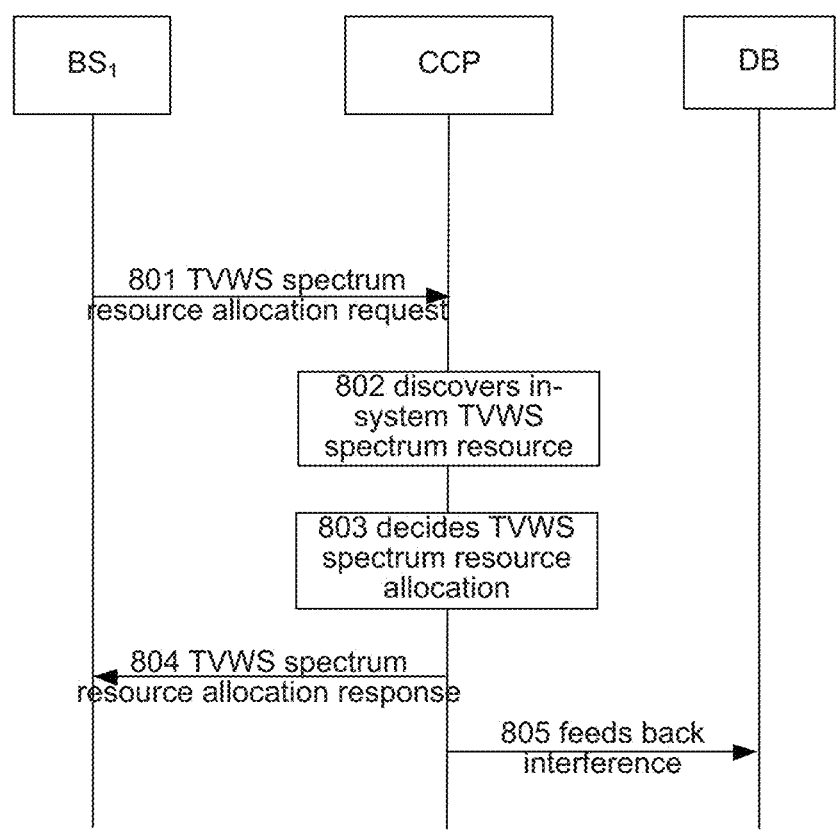
FIG. 8 is an interference allocating method based on a secondary system a signaling flowchart according to a fifth embodiment herein.

A BS1 may be added to a TVWS spectrum resource on which the secondary system BS2 is working. A reconfiguration managing node may adjust the transmit power for any BS within the system. Such a signaling flow may be as shown in FIG. 8, and is elaborated as follows.

In step 801, BS1 may issue a TVWS spectrum resource request to a reconfiguration managing node CCP of a secondary system managing the BS1.

BS1 may send locational information per se, and related capability or resource requirement information such as a supported working frequency range 470-560 MHz, a bandwidth 5 MHz, an expected transmit power 30 dBm, or the like, to the CCP.

In step 802, CCP may discover any TVWS spectrum resource within the system.

The CCP may search any TVWS spectrum resource being used by BS2 within the system, and may discover that an upper limit of interference tolerance allocated by a database has not been reached for a resource f1. Previously, the database allocated the resource f1 to the CCP with an allowed interference Imax=−60 dBm. An actual interference produced by BS2 within the system is −64 dBm only. Therefore, a margin of −62.2 dBm is available.

Before usage, it may be determined, according to a pre-defined rule, whether a confirmation from the database is needed.

That is, when according to the rule, the 40 dBm initially allocated is the overall interference allocated to the secondary system, then no confirmation is needed.

When the rule specifies that, after accomplishing actual configuration, the secondary system has fed the actual interference produced back to the database, and the database may allocate a margin of deducting the actual interference produced to another system allocation, it is required to confirm whether there is any interference margin left.

In step 803, CCP may reallocate the previously allocated TVWS spectrum resource.

When BS1 performs transmitting with an expectation power, according to the location of BS1 and a path loss model, an interference of −64 dBm produced at a reference point of a protection band of a primary user may be computed, which is less than the remaining interference tolerance, which says that TVWS may be used by BS1 with the expected power.

In step 804, CCP may send a configuration command to BS1.

In step 805, CCP may feed, back to the database, an actual interference produced.

Sixth Embodiment

Figure 9:
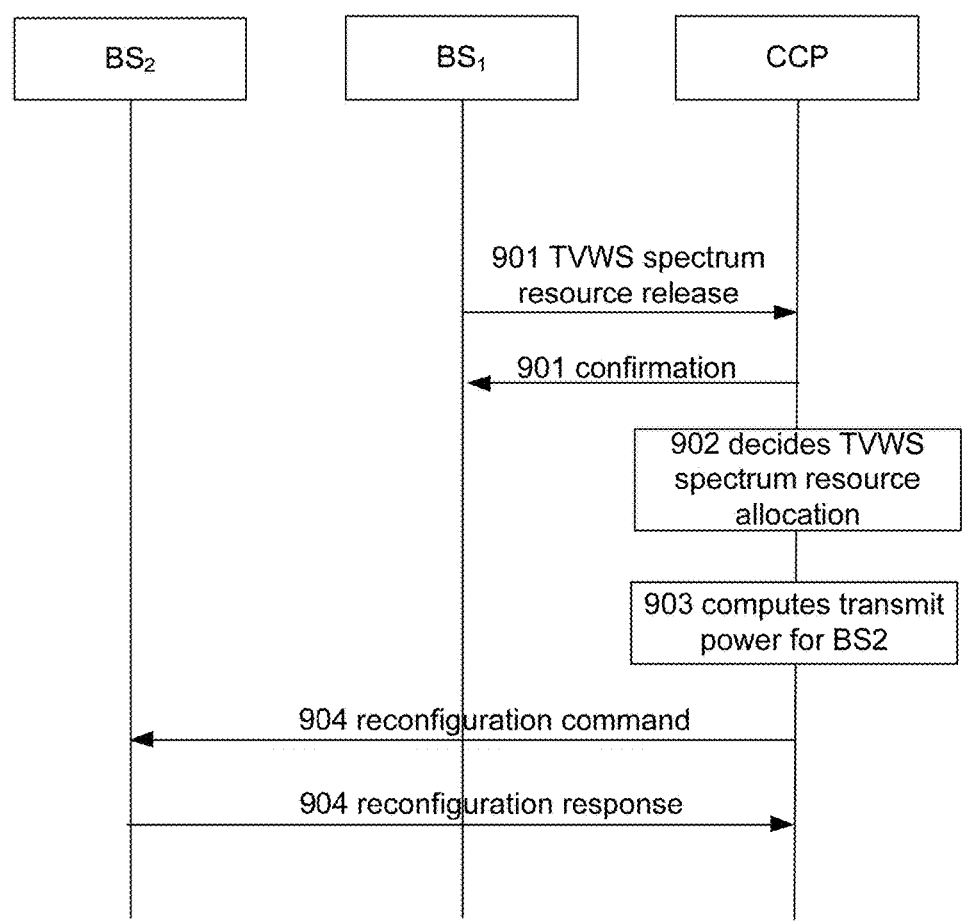
FIG. 9 is a signaling flowchart of an interference allocating method based on a secondary system according to a sixth embodiment herein.

BS1 and BS2 of a secondary system may be working on a TVWS spectrum resource f1. A load of BS1 may drop, and BS1 may no longer need the TVWS spectrum resource. A reconfiguration managing node may adjust the transmit power of BS2 within the system. Such a signaling flow may be as shown in FIG. 9, and is elaborated as follows.

In step 901, a load of BS1 may drop; BS1 may no longer need an additional configured TVWS spectrum resource f1; BS1 may issue, to a reconfiguration managing node CCP of a secondary system, a message to release the TVWS spectrum resource f1.

In step 902, the CCP may decide how to allocate a TVWS spectrum resource within the system.

The CCP may search for the resource f1 being used by BS2 within the system. However, due to previous coordinated allocation between both BSs, the transmit power has not reached the expectation. Before BS1 releases f1, interference allocation within the system may be: allowed interference Imax=−60 dBm, $I_{BS1}$=−64 dBm, $I_{BS2}$=−62.2 dBm.

As BS1 releases f1, Imax=−60 dBm may be used by BS2 alone.

In step 903, CCP may re-compute the transmit power for BS2.

The computation may be based on the location of BS2 and a path loss model. With an interference Imax=−60 dBm produced by BS2 at a reference point of a coverage edge of a primary user, a transmit power (computed with known art, for example) may be 50 dBm.

In step 904, CCP may send BS2 a reconfiguration command, increasing the transmit power of BS2 on f1 to 50 dBm. BS2 may return a reconfiguration response.

The method here may be extended to a case in which multiple BSs all work on one TVWS spectrum resource. After some BS(s) release the TVWS spectrum resource, the CCP may, as needed by some other BS(s), coordinate transmit power allocation among the BSs within the range of an overall interference Imax allowed for the system.

Seventh Embodiment

Figure 10:
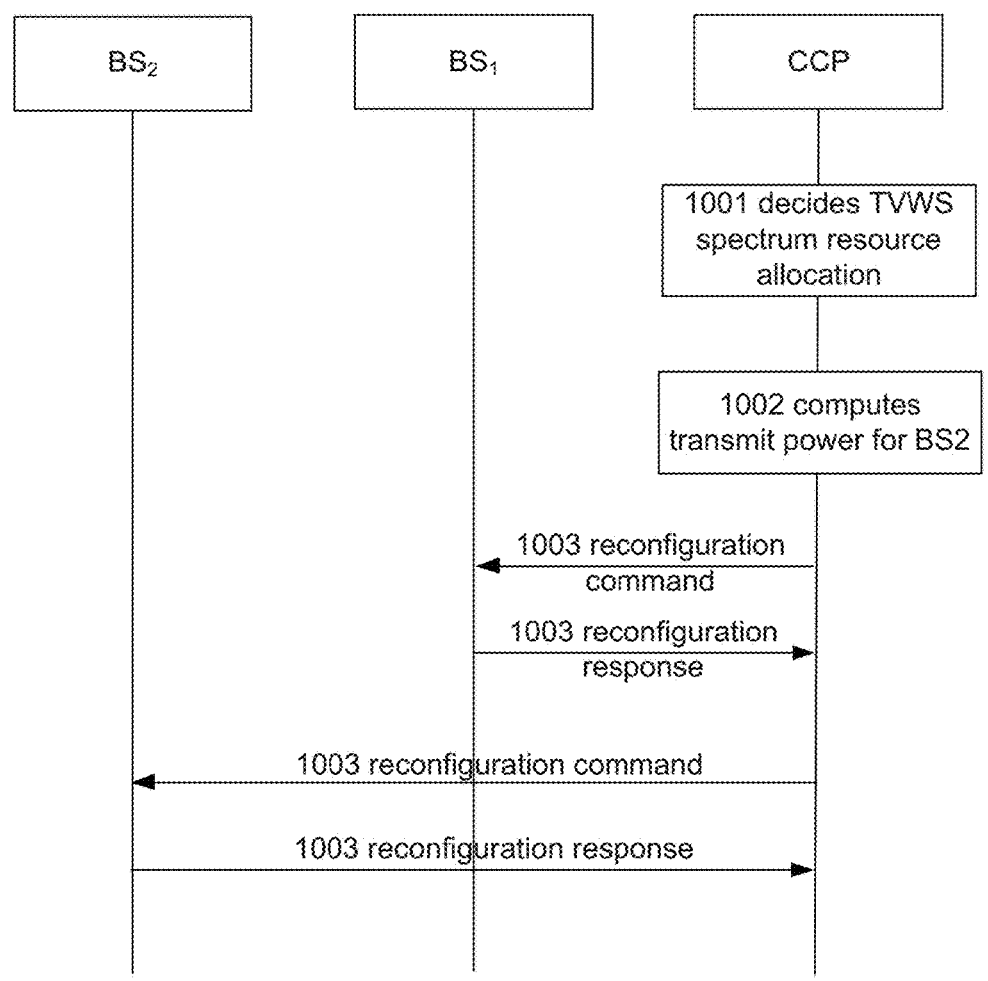
FIG. 10 is a signaling flowchart of an interference allocating method based on a secondary system according to a seventh embodiment herein.

BS1 and BS2 of a secondary system may be working on a TVWS spectrum resource f1. A CCP may adjust the transmit power according to the changed requirement of the BSs and an overall interference Imax allowed for a system. Such a signaling flow may be as shown in FIG. 10, and is elaborated as follows.

The transmit power requirement of a BS may change. Due to a lowered coverage requirement, BS1 may no longer need f1 to cover an original range. Therefore, the transmit power requirement thereof has lowered.

In step 1001, a CCP may decide how to allocate a TVWS spectrum resource within the system.

The CCP may search for the resource f1 being used by BS2 within the system. However, due to previous coordinated allocation between both BSs, the transmit power has not reached the expectation. Before BS1 releases f1, interference allocation within the system may be: allowed interference Imax=−60 dBm, $I_{BS1}$=−62.2 dBm, $I_{BS2}$=−64 dBm.

The transmit power of BS1 may lower from 40 dBm to 30 dBm. Thus, an interference produced by BS1 may lower from $I_{BS1}$=−62.2 dBm to $I_{BS1}'$=−64 dBm. Therefore, within an overall interference quota of Imax=−60 dBm, interference of BS2 may reach $I_{BS2}'$=−60 dBm−(−64 dBm)=−62.2 dBm.

In step 1002, CCP may re-compute the transmit power for BS2.

The computation may be based on the location of BS2 and a path loss model. With an interference $I_{BS2}'$=−62.2 dBm produced by BS2 at a reference point of a coverage edge of a primary user, a transmit power may be 50 dBm.

In step 1003, CCP may send a reconfiguration command respectively to BS1 and BS2, increasing the transmit power of BS2 on f1 to 50 dBm. BS1 and BS2 may each return a reconfiguration response.

The method here may be extended to a case in which multiple BSs all work on one TVWS spectrum resource. The CCP may, according to lowered or increased transmit power of some BS(s), coordinate transmit power allocation among the BSs within the range of an overall interference Imax allowed for the system.

Eighth Embodiment

Figure 11:
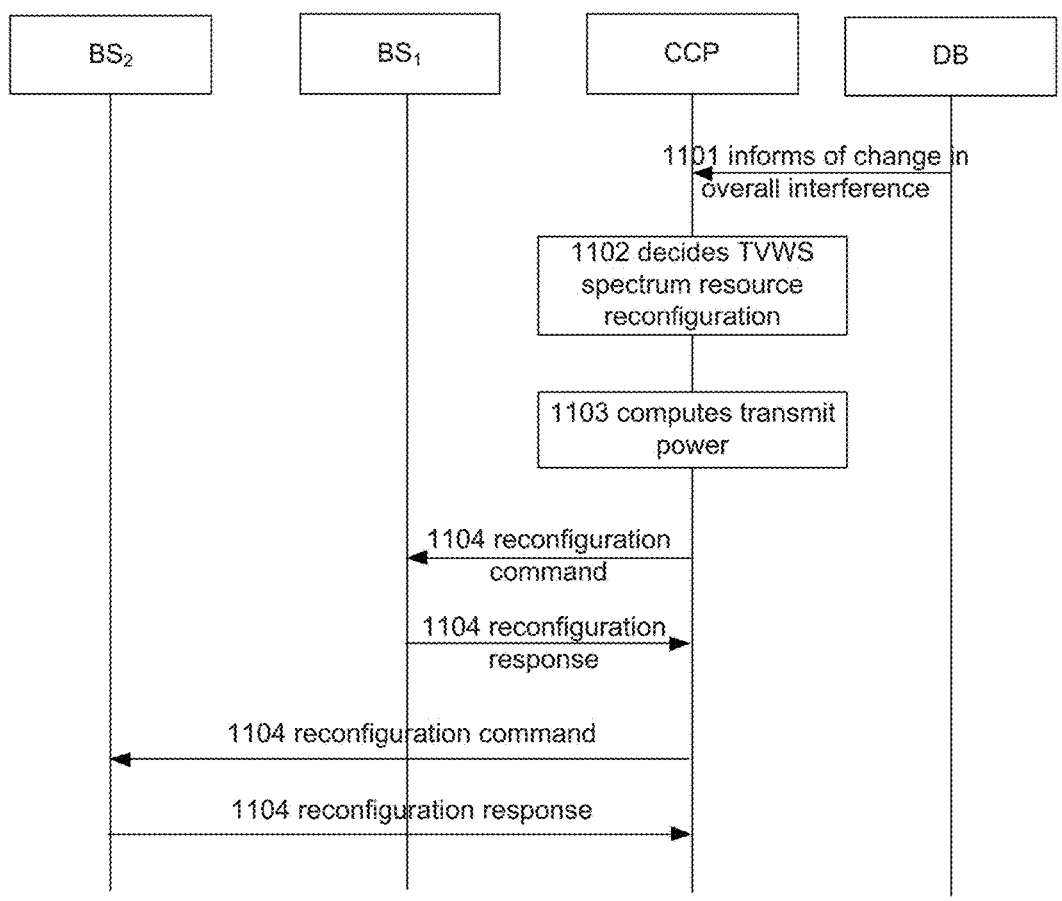
FIG. 11 is a signaling flowchart of an interference allocating method based on a secondary system according to an eighth embodiment herein.

BS1 and BS2 of a secondary system may be working on a TVWS spectrum resource f1. An overall interference Imax allowed for the system lowers. A CCP may adjust the transmit power of the BSs. Such a signaling flow may be as shown in FIG. 11, and is elaborated as follows.

In step 1101, a database may inform a CCP that an overall interference Imax a secondary system is allowed to produce on f1 lowers from −60 dBm to −80 dBm.

In step 1102, the CCP may decide how to perform spectrum reconfiguration within the system.

The CCP may search for the resource f1 being used by BS1 and BS2 within the system. An overall interference has lowered. Therefore, the CCP may decide to proportionally lower the transmit power of the BSs. Before Imax changes, interference allocation within the system may be: allowed interference Imax=−60 dBm, $I_{BS1}$=−62.2 dBm, $I_{BS2}$=−64 dBm.

When Imax'=−80 dB, the transmit power of the two BSs may be proportionally lowered to: $I_{BS1}'$=−82.2 dBm, $I_{BS2}'$=−84 dBm.

In step 1103, the CCP may re-compute the transmit power for BS1 and BS2.

The computation may be based on the locations of BS1 and BS2 and any path loss model thereof. The transmit power of BS1 and BS2 may be adjusted to 30 dBm and 20 dBm, respectively.

In step 1104, CCP may send a configuration command to BS1 and BS2, respectively. BS1 and BS2 may return a reconfiguration response, respectively.

The method here may be extended to a case in which multiple BSs all work on one TVWS spectrum resource. CCP may coordinate transmit power allocation among the BSs according to an amount an overall interference has lowered or increased.

Ninth Embodiment

Figure 12:
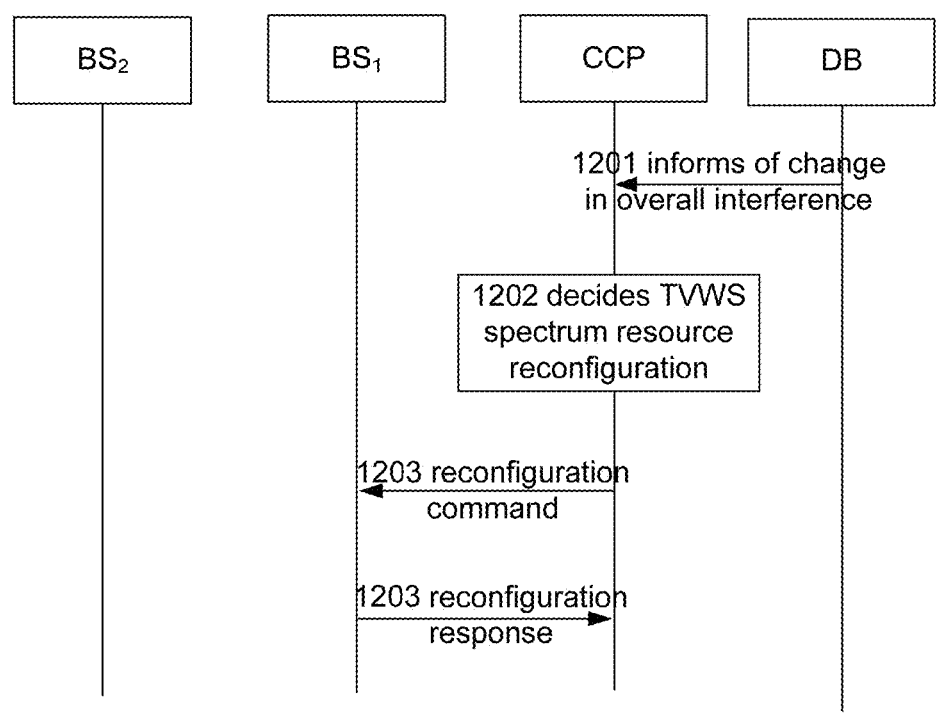
FIG. 12 is a signaling flowchart of an interference allocating method based on a secondary system according to a ninth embodiment herein.

In the Eighth Embodiment, when Imax changes, CCP may proportionally lower the transmit power of the BSs. Alternatively, a CCP may shut down some BS(s). Such a signaling flow may be as shown in FIG. 12, and is elaborated as follows.

In step 1201, a database may inform a CCP that an overall interference Imax a secondary system is allowed to produce on f1 lowers from −60 dBm to −80 dBm.

In step 1202, the CCP may decide how to perform spectrum reconfiguration within the system.

The CCP may search for the resource f1 being used by BS1 and BS2 within the system. An overall interference has lowered. Therefore, the CCP may decide to shut down BS1 communication on f1. Assume here BS2 has produced an interference $I_{BS2}$=−80 dBm, meeting a requirement of a changed Imax. Thus, it is not necessary to lower the transmit power of BS2.

In step 1203, the CCP may send reconfiguration signaling to BS1, commanding BS1 to stop communication on f1. BS1 may return a reconfiguration response.

The embodiment may be used in conjunction with the Eighth Embodiment, for example, when the Imax requirement is not met after BS1 has been shut down, the transmit power of BS2 may be lowered correspondingly.

Tenth Embodiment

Figure 13:
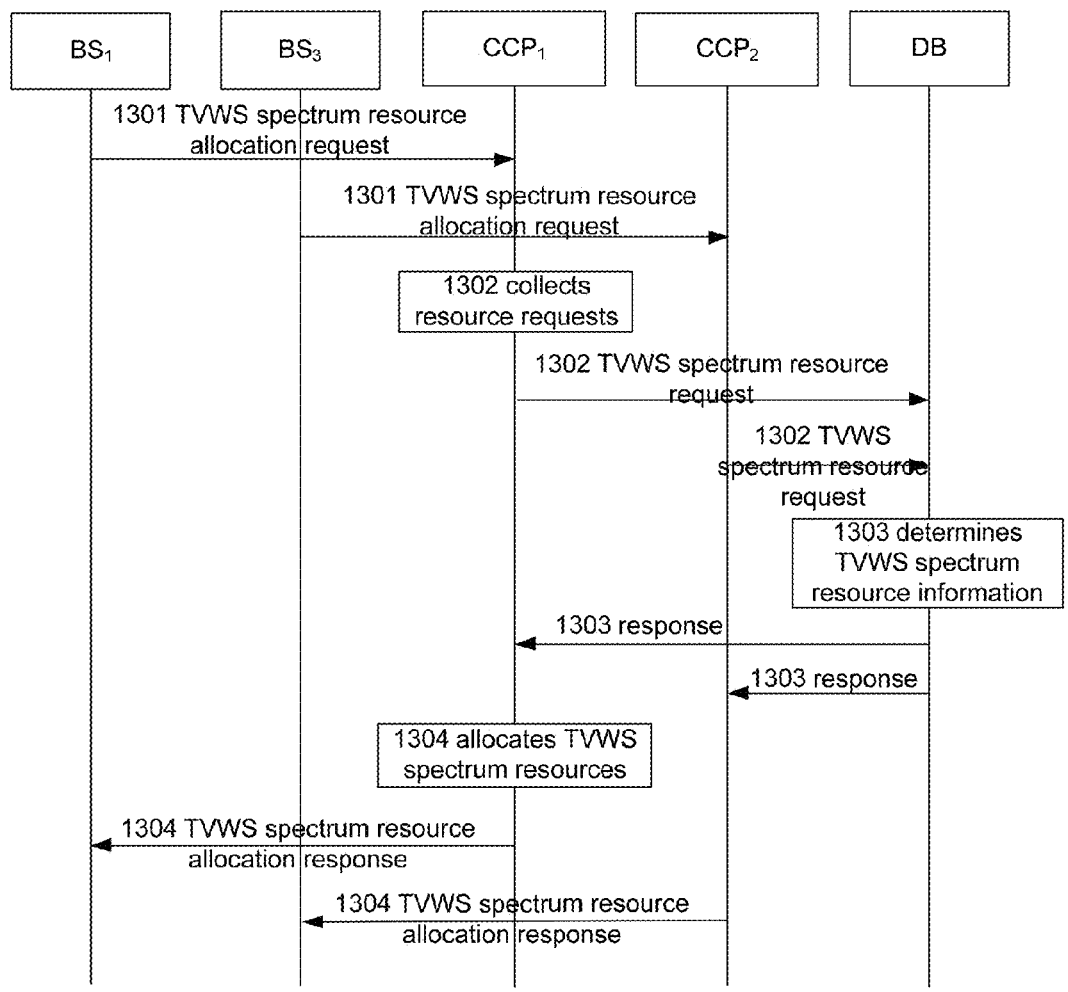
FIG. 13 is a signaling flowchart of an interference allocating method based on a secondary system according to a tenth embodiment herein.

When multiple secondary systems are simultaneously using a same TVWS spectrum resource, a database may allocate for the multiple secondary systems, based on a nature of a secondary system, a further interference a primary user of the current target TVWS spectrum may endure. Such a signaling flow may be as shown in FIG. 13, and is elaborated as follows.

In step 1301, BS1 and BS3 may send a spectrum resource request respectively to reconfiguration managing nodes CCP1 and CCP2 of secondary systems respectively managing the BSs.

The BSs may respectively report related information, such that the CCP may allocate any proper resource. BS1 may be under the management of the CCP1. BS1 may send locational information per se, and related capability or resource requirement information such as a supported working frequency range 470-560 MHz, a bandwidth 5 MHz, an expected transmit power 30 dBm, or the like, to the CCP1. BS3 may be under the management of the CCP2. BS3 may send locational information per se, and related capability or resource requirement information such as a supported working frequency range 470-560 MHz, a bandwidth 5 MHz, an expected transmit power 30 dBm, or the like, to the CCP2.

In step 1302, CCP1 and CCP2 may respectively send a resource request to a database.

The any resource request sent by CCP1 or CCP2 to the database may contain the nature of a requested resource, a supported working frequency range 470-560 MHz, a bandwidth 5 MHz, and any parameter facilitating interference allocation by the database. A request from CCP1 may include a BS number of 1, a transmit power level of 40 dBm, and locational distribution information. A request from CCP2 may include a BS number of 1, a transmit power level of 30 dBm, and locational distribution information.

In step 1303, the database may perform system allocation of allowed interference.

The database first may check any TVWS spectrum resource in an area including a resource-applying BS. A spectrum of a central frequency f1=503 MHz and a bandwidth 6 MHz may be idle and available. An interference tolerance threshold may be −60 dBm. An interference already produced on the resource may be −64 dBm. Thus, the remaining interference may be −62.2 dBm.

The interference already produced may be an allowed interference previously allocated to the secondary system $CCP_3$ by the database.

A BS may allocate an interference weight respectively to each secondary system according to information provided by CCP1 and CCP2. Given a BS number, a transmit power level, and locational distribution of a secondary system, an allocating result may be: CCP1: −64 dBm; CCP2: −67 dBm. Namely, −62.2 dBm=(−64 dBm)+(−67 dBm). This together with related TVWS information and protection band information may be fed back to a corresponding CCP by the BS.

In step 1304, CCP1 and CCP2 may respectively compute the transmit power for a BS under respective management, and send a final allocation to the BS.

Take CCP1 as an example. BS1 may perform transmitting with the expected transmit power thereof. Computation using a path loss model may give an interference of −64 dBm at a reference point. The maximal interference allowed may be −64 dBm. Therefore, BS1 may perform transmitting with the expected power.

Similarly, the CCP2 may compute the transmit power for BS3 and determine that BS3 may perform transmitting with the expected transmit power thereof.

Eleventh Embodiment

Figure 14:
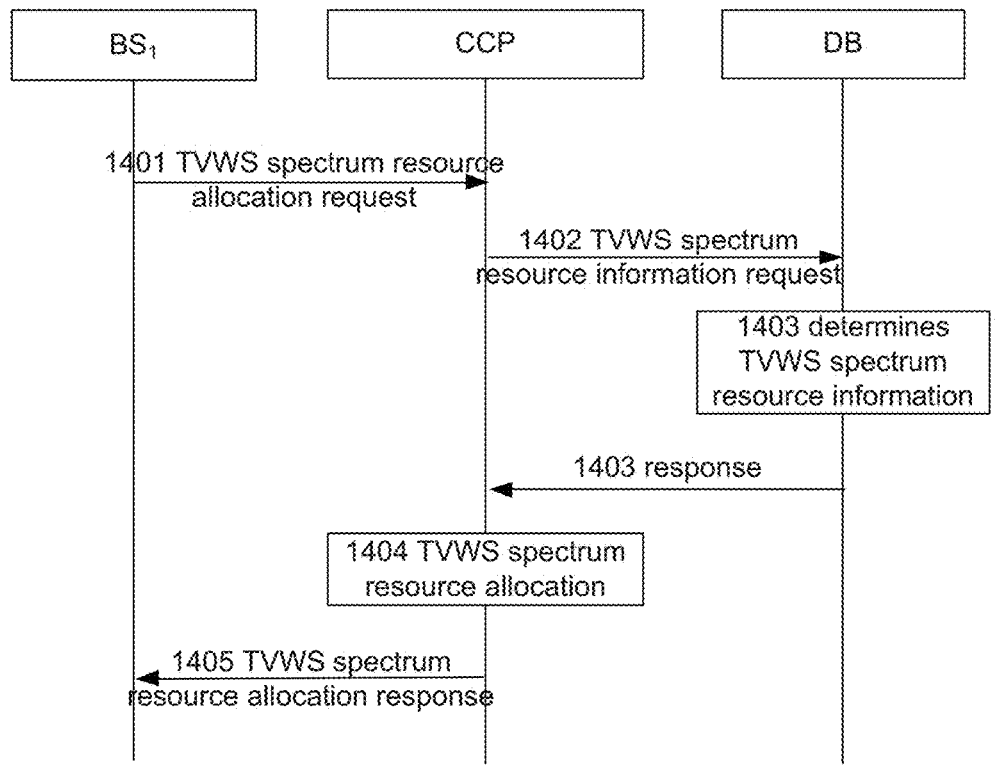
FIG. 14 is a signaling flowchart of an interference allocating method based on a secondary system according to an eleventh embodiment herein.

No secondary system may be working on a target TVWS spectrum. a secondary system may be working a frequency adjacent to the target TVWS spectrum. Given the transmit parameter requirement of the target TVWS spectrum and the frequency adjacent thereto, a reconfiguration managing node of the secondary system may allocate the power for a BS under management on the TVWS spectrum resource. A CCP may serve as the reconfiguration managing node for illustrative purpose. A detailed flow may be as shown in FIG. 14, and is elaborated as follows.

In step 1401, a BS1 may initiate a TVWS spectrum resource request to a Central Control Node (CCP) of a secondary system managing the BS1.

BS1 may send locational information per se, and related capability or resource requirement information such as a supported working frequency range 470-560 MHz, a bandwidth 5 MHz, an expected transmit power 30 dBm, an Adjacent Channel Leakage Ratio ACLR or a spectrum template, or the like, to the CCP.

In step 1402, the CCP may send a TVWS spectrum resource request to a database.

In step 1403, the database may feed primary user information and related protection information back to the CCP.

The database may search any TVWS spectrum resource in the range including BS1 for an idle working frequency f1=503 MHz with a bandwidth 5 MHz, and allocate found resource to the CCP. According to a record of the database, no other secondary system is using the resource allocated. A secondary system is working on frequencies $f_2$ and $f_3$ adjacent to f1, producing an interference $I_1$. Therefore, the database may feed back the primary user protection information at f1 and the frequencies $f_2$, $f_3$ adjacent thereto, which may include protection band information, such as location coordinates of a protection band, and any interference tolerance threshold therefor, i.e., −80 dBm for f1 and −100 dBm for $f_2$ and $f_3$.

In step 1404, the CCP may allocate, according to the acquired primary user protection information, a resource for BS1 under management issuing the resource request, and may provide a maximal transmit power.

The CCP may compute, according to a reference point and the location coordinates of the resource-applying BS1 as well as a transmission model in between, the transmit power of BS1 to be 40 dBm when an interference at the reference point reaches −80 dBm. A reference point may be a point on a protection band where the resource-applying BS produces a maximal interference, and may be selected according to location coordinates of a protection band in the primary user protection information. Thus, 40 dBm may be the maximal transmit power allowed for BS1, which can meet the transmit power requirement of BS1. BS1 may perform transmitting with the expected transmit power 30 dBm.

CCP may then investigate whether the frequency adjacent thereto meets the requirement. Take $f_2$ as an example. Given the transmit power of 30 dBm and a spectrum template of BS1, a spectrum template function may be integrated on the frequency band $f_2$ adjacent thereto under investigation to obtain a power leakage to the frequency adjacent thereto with a transmit power of 30 dBm. Then, the reference point of the primary user corresponding to the frequency $f_2$ adjacent thereto may be selected. An interference of the frequency adjacent thereto may be computed using a path loss model to obtain an interference −110 dBm produced on the frequency $f_2$ adjacent thereto by BS1 with a transmit power of 30 dBm. It meets the requirement −100 dBm. Therefore, the resource may be suitable for being used by BS1.

In step 1405, the CCP may send BS1 a resource allocating message, including the determined frequency 503 MHz, the bandwidth 5 MHz, the transmit power 30 dBm, accomplishing the spectrum resource allocating flow.

An embodiment herein may further provide a non-transitory computer storage medium, storing computer-executable instructions for executing the interference allocating method.

Figure 15:
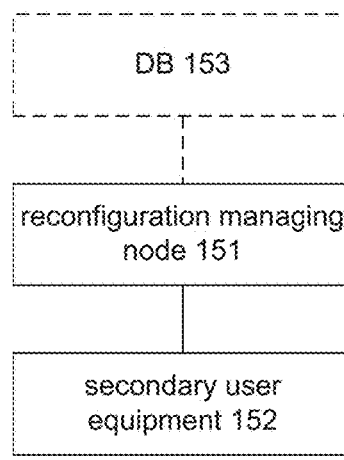
FIG. 15 is a diagram of a structure of an interference allocating system according to an embodiment herein.

An embodiment herein may further provide an interference allocating system based on a secondary system. As shown in FIG. 15, the system may include a reconfiguration managing node 151 and a secondary user equipment 152 under management of the reconfiguration managing node 151. The reconfiguration managing node 151 as a reconfiguration managing node of a secondary system, may be a physical entity or a logical entity based on radio accessing technology or an operator configured for: formulating a spectrum resource reconfiguration strategy within the range of the operator or the radio accessing technology, and/or reconfiguring a spectrum resource of a secondary user equipment.

Figure 16:
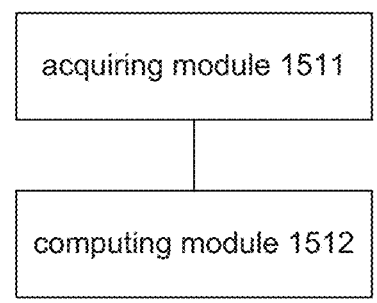
FIG. 16 is a diagram of a structure of a reconfiguration managing node according to an embodiment herein.

As shown in FIG. 16, the reconfiguration managing node 151 may include a acquiring module 1511 and a computing module 1512.

The acquiring module 1511 may be configured for: acquiring or receiving information on an idle spectrum resource, and information on an overall interference the secondary system is allowed to produce on the idle spectrum resource.

The computing module 1512 may be configured for: computing, according to the information on the overall interference the secondary system is allowed to produce, a transmit power for the secondary user equipment 152 under management of the reconfiguration managing node.

Figure 17:
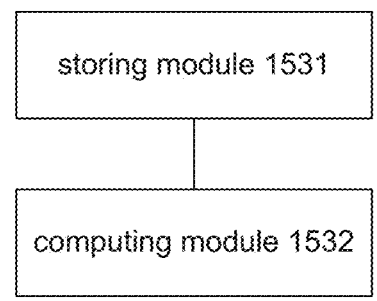
FIG. 17 is a diagram of a structure of a database according to an embodiment herein.

As shown in FIG. 15, the interference allocating system may further include a database 153. As shown in FIG. 17, the database 153 may include a storing module 1531 and a computing module 1532.

The storing module 1531 may be configured for storing primary user spectrum resource usage information.

The acquiring module 1511 may be further configured for acquiring or receiving, from the database 153, the information on the idle spectrum resource and the information on the overall interference the secondary system is allowed to produce on the idle spectrum resource.

The idle spectrum resource information may be information on an idle spectrum resource of a primary user allowed to be configured for the secondary system within the range of idle spectrum resources expected to be configured for the secondary system. The information on the idle spectrum resource may include at least one of:

a frequency, a bandwidth, an idle duration, coverage edge information, protection band information, an interference tolerance threshold.

The computing module 1532 of the database 153 may be configured for computing, according to the interference tolerance threshold of the primary user on the idle spectrum resource and an interference already produced on the coverage edge of the primary user, a further interference tolerable to the primary user.

Alternatively, the computing module 1532 may be configured for allocating, according to the interference tolerance threshold of the primary user and/or the further interference tolerable to the primary user, and according to the nature of any secondary system, an overall interference the any secondary system is allowed to produce. The overall interference the any secondary system is allowed to produce may accumulate to give the further interference tolerable to the primary user.

The computing module 1532 of the database 153 may be further configured for: obtaining, by computing the overall interference on the idle spectrum resource allocated to any secondary system, the interference already produced.

Alternatively, the computing module 1532 may be further configured for obtaining, from feedback on an actual interference produced by a secondary system, the interference already produced. Alternatively, the computing module 1532 may be further configured for obtaining, by sensing and measuring an actual interference on the idle spectrum resource, the interference already produced. A nature of a secondary system may include historical interference information and/or payment information and/or priority information and/or a transmit parameter requirement of the secondary system.

The transmit parameter requirement may be information related to weighing an actual transmit power requirement of the secondary system on the idle spectrum resource. The transmit parameter requirement may be obtained when the reconfiguration managing node 151 collects a spectrum resource request of a secondary user equipment 152 under management. The transmit parameter requirement may include a number of BS issuing a resource request and/or a locational distribution of BSs issuing a resource request and/or a transmit power level of any BS and/or an overall transmit power requirement of any BS.

The priority information may be a priority level for system power allocation predetermined by a Cognitive Radio system and/or an operator.

The payment information may be information on a fee paid by the secondary system for using the idle spectrum resource.

The historical interference information may be information on historical interference to the primary user produced by the secondary system when previously using the idle spectrum resource.

The computing module 1532 in the database 153 may allocate, according to the interference tolerance threshold of the primary user and/or the further interference tolerable to the primary user, and according to the nature of any secondary system, an overall interference the any secondary system is allowed to produce as follows.

The computing module 1532 may allocate, according to the transmit parameter requirement and/or the priority information and/or the payment information and/or the historical interference information of any secondary system, an interference weight to the any secondary system as follows. The computing module 1532 may allocate a large interference weight to a secondary system with a large transmit parameter requirement and/or a high priority level and/or a high fee payment and/or a small historical interference to allow the secondary system to produce a large interference. The computing module 1532 may allocate a small interference weight to a secondary system with a small transmit parameter requirement and/or a low priority level and/or a low fee payment and/or a large historical interference to allow the secondary system to produce a small interference.

The computing module 1532 may obtain the overall interference the any secondary system is allowed to produce by determining, according to the interference weight, a ratio of the overall interference the any secondary system is allowed to produce to the interference tolerance threshold of the primary user and/or the further interference tolerable to the primary user.

The computing module 1512 in the reconfiguration managing node 151 may compute, according to the information on the overall interference the secondary system is allowed to produce, a transmit power for a secondary user equipment under management as follows.

When an interference on the coverage edge of the primary user produced by the secondary user equipment 152 reaches the overall interference, the computing module 1512 may compute the transmit power of the secondary user equipment 152 according to location coordinates of the secondary user equipment 152 under management, location coordinates of the coverage edge of the primary user, and a propagation model. The transmit power of the secondary user equipment 152 may be a maximal transmit power the secondary user equipment 152 is allowed to have.

Alternatively, when multiple secondary user equipment 152 under management of the reconfiguration managing node 151 simultaneously use the idle spectrum resource, and an interference on the coverage edge of the primary user produced by the multiple secondary user equipment 152 working simultaneously reaches the overall interference, the computing module 1512 may compute a transmit power of each of the multiple secondary user equipment 152.

The computing module 1512 in the reconfiguration managing node 151 may compute, according to the information on the overall interference the secondary system is allowed to produce, a transmit power for a secondary user equipment 152 under management of the reconfiguration managing node 151 as follows.

The computing module 1512 may adjust, according to the change in the overall interference the secondary system is allowed to produce, a transmit power of a secondary user equipment 152 under management. Alternatively, the computing module 1512 may determine a transmit power for a secondary user equipment 152 having recently joined the secondary system. Alternatively, the computing module 1512 may optimize a transmit power of a secondary user equipment 152.

An embodiment herein may further provide a database. A structure of the database and a function thereof may be the same as shown in FIG. 17 and is not repeated.

An embodiment herein may further provide a managing node, which may apply to a reconfiguration managing node of a secondary system. A structure of the managing node and a function thereof may be the same as shown in FIG. 16 and is not repeated.

In an actual application, both the acquiring module 1511 and the computing module 1512 may be implemented by a Central Processing Unit (CPU), a Digital Signal Processor (DSP), a Micro Processor Unit (MPU), a Field Programmable Gate Array (FPGA), or the like. The CPU, DSP, MPU, FPGA may all be built in the reconfiguration managing node.

In an actual application, both the storing module 1531 and the computing module 1532 may be implemented by a CPU, a DSP, a MPU, a FPGA, or the like. The CPU, DSP, MPU, FPGA may all be built in the reconfiguration managing node.

Those skilled in the art should understand that functions implemented by a processing module of the interference allocating system shown in FIG. 15, a processing module of the reconfiguration managing node shown in FIG. 16, and a processing module of the database shown in FIG. 17 may be understood with reference to illustration of the interference allocating method.

Those skilled in the art will know that an embodiment herein may provide a method, system, or computer program product. Therefore, an embodiment herein may take on a form of hardware, software, or a combination thereof. In addition, an embodiment herein may take on a form of a computer program product implemented on one or more computer available storage media (including but not limited to, magnetic disk memory, optic memory, and the like) containing computer available program codes.

The disclosure is illustrated with reference to flowcharts and/or block diagrams of the method, device (system) and computer-program product according to embodiments described herein. Note that each flow in the flowcharts and/or each block in the block diagrams as well as combination of flows in the flowcharts and/or blocks in the block diagrams may be implemented by instructions of a computer program. Such instructions may be offered in a processor of a general-purpose computer, a dedicated computer, an embedded processor or other programmable data processing devices to generate a machine, such that a device with a function specified in one or more flows of the flowcharts and/or one or more blocks in the block diagrams is produced by instructions executed by a processor of a computer or other programmable data processing devices.

These computer-program instructions may also be stored in a non-transitory computer-readable memory capable of guiding a computer or another programmable data processing device to work in a given way, such that the instructions stored in the computer-readable memory generate a manufactured good including an instruction device for implementing a function specified in one or more flows of the flowcharts and/or one or more blocks in the block diagrams.

These computer-program instructions may also be loaded in a computer or other programmable data processing devices, which thus executes a series of operations thereon to generate computer-implemented processing, such that the instructions executed on the computer or other programmable data processing devices provide the steps for implementing the function specified in one or more flows of the flowcharts or one or more blocks in the block diagrams. What described are merely embodiments of the disclosure, and are not intended to limit the scope of the present disclosure.

The invention claimed is:

1. An interference allocating method, comprising:
acquiring or receiving, by a reconfiguration managing node of a secondary system, information on an idle spectrum resource, and information on an overall interference the secondary system is allowed to produce on the idle spectrum resource; and
computing, by the reconfiguration managing node according to the information on the overall interference the secondary system is allowed to produce, a transmit power for a secondary user equipment under management of the reconfiguration managing node,
wherein the acquiring or receiving, by the reconfiguration managing node, the information on the idle spectrum resource and the information on the overall interference the secondary system is allowed to produce on the idle spectrum resource comprises:
acquiring or receiving, by the reconfiguration managing node from a database configured for storing primary user spectrum resource usage information, the information on the idle spectrum resource and the information on the overall interference the secondary system is allowed to produce on the idle spectrum resource,
wherein the information on the idle spectrum resource comprises
information on an idle spectrum resource of a primary user allowed to be configured for the secondary system within the range of idle spectrum resources expected to be configured for the secondary system, comprising at least one of:
a frequency, a bandwidth, an idle duration, coverage edge information, protection band information, an interference tolerance threshold,
wherein the method further comprises:
computing, by the database according to the interference tolerance threshold of the primary user on the idle spectrum resource and an interference already produced on the coverage edge of the primary user, a further interference tolerable to the primary user; or
allocating, by the database according to the interference tolerance threshold of the primary user and/or the further interference tolerable to the primary user, and according to the nature of any secondary system, an overall interference the any secondary system is allowed to produce, wherein the overall interference the any secondary system is allowed to produce accumulates to give the further interference tolerable to the primary user.

2. The method according to claim 1, wherein the information on the overall interference the secondary system is allowed to produce on the idle spectrum resource, comprises:
a maximal overall interference any network element using the idle spectrum resource in the secondary system is allowed to produce on a coverage edge of a primary user.

3. The method according to claim 1, wherein the interference already produced comprises an interference to the primary user produced by a secondary system working on the idle spectrum and/or an interference to the primary user produced by a secondary system working on a frequency adjacent to the idle spectrum,
wherein the method further comprises:
obtaining, by the database by computing the overall interference on the idle spectrum resource allocated to any secondary system, the interference already produced; or
obtaining, by the database from feedback on an actual interference produced by a secondary system, the interference already produced; or
obtaining, by the database by sensing and measuring an actual interference on the idle spectrum resource, the interference already produced.

4. The method according to claim 1, wherein the nature of a secondary system comprises at least one of: historical interference information, payment information, priority information, and a transmit parameter requirement of the secondary system, wherein
the transmit parameter requirement is information related to weighing an actual transmit power requirement of the secondary system on the idle spectrum resource, obtained when the reconfiguration managing node collects a spectrum resource request of a secondary user equipment under management, comprising a number of Base Stations (BS) issuing a resource request and/or a locational distribution of BSs issuing a resource request and/or a transmit power level of any BS and/or an overall transmit power requirement of any BS;
the priority information is a priority level for system power allocation predetermined by a Cognitive Radio system and/or an operator;
the payment information is information on a fee paid by the secondary system for using the idle spectrum resource;
the historical interference information is information on historical interference to the primary user produced by the secondary system when previously using the idle spectrum resource,
wherein the allocating, by the database according to the interference tolerance threshold of the primary user and/or the further interference tolerable to the primary user, and according to the nature of any secondary system, an overall interference the any secondary system is allowed to produce comprises:
allocating, by the database according to the transmit parameter requirement and/or the priority information and/or the payment information and/or the historical interference information of any secondary system, an interference weight to the any secondary system by:
allocating a large interference weight to a secondary system with a large transmit parameter requirement and/or a high priority level and/or a high fee payment and/or a small historical interference to allow the secondary system to produce a large interference, and allocating a small interference weight to a secondary system with a small transmit parameter requirement and/or a low priority level and/or a low fee payment and/or a large historical interference to allow the secondary system to produce a small interference;

obtaining, by the database, the overall interference the any secondary system is allowed to produce by determining, according to the interference weight, a ratio of the overall interference the any secondary system is allowed to produce to the interference tolerance threshold of the primary user and/or the further interference tolerable to the primary user.

5. The method according to claim 1, wherein the computing, by the reconfiguration managing node according to the information on the overall interference the secondary system is allowed to produce, a transmit power for a secondary user equipment under management comprises:

when an interference on the coverage edge of the primary user produced by the secondary user equipment reaches the overall interference, computing the transmit power of the secondary user equipment as a maximal transmit power the secondary user equipment is allowed to have according to location coordinates of the secondary user equipment under management, location coordinates of the coverage edge of the primary user, and a propagation model; or when multiple secondary user equipment under management of the reconfiguration managing node simultaneously use the idle spectrum resource, and an interference on the coverage edge of the primary user produced by the multiple secondary user equipment working simultaneously reaches the overall interference, computing a transmit power of each of the multiple secondary user equipment.

6. The method according to claim 1, wherein the computing, by the reconfiguration managing node according to the information on the overall interference the secondary system is allowed to produce, a transmit power for a secondary user equipment under management comprises:

adjusting, by the reconfiguration managing node according to the change in the overall interference the secondary system is allowed to produce, a transmit power of a secondary user equipment under management; or determining, by the reconfiguration managing node, a transmit power for a secondary user equipment having recently joined the secondary system; or optimizing, by the reconfiguration managing node, a transmit power of a secondary user equipment.

7. The method according to claim 6, wherein the secondary user equipment comprises a Base Stations (BS) and/or an accessing node, the reconfiguration managing node computes the transmit power for the secondary user equipment under management by computing a maximal transmit power any secondary user equipment under management is allowed to have; or the reconfiguration managing node provides information on a maximal transmit power allowed for a BS of the secondary system, and then the BS of the secondary system allocates a transmit power for an accessing node under management of the BS.

8. The method according to claim 6, wherein the adjusting, by the reconfiguration managing node according to the change in the overall interference the secondary system is allowed to produce, a transmit power of a secondary user equipment under management comprises:

adjusting, by the reconfiguration managing node according to increase or decrease of the overall interference the secondary system is allowed to produce on an idle spectrum resource, the transmit power for the secondary user equipment under management, comprising:

proportionally increasing or decreasing the transmit power of any secondary user equipment under management working on the idle spectrum resource according to a ratio of the increase or decrease of the overall interference the secondary system is allowed to produce;

or increasing or decreasing the transmit power of some secondary user equipment;

or increasing a number of secondary user equipment working on the idle spectrum resource, or reducing a number of secondary user equipment working on the idle spectrum resource.

9. The method according to claim 6, wherein the determining the transmit power for the secondary user equipment having recently joined the secondary system comprises:

when the secondary user equipment having recently joined the secondary system starts up, computing, by the reconfiguration managing node, an interference the secondary user equipment having recently joined the secondary system is allowed to produce according to the acquired overall interference the secondary system is allowed to produce on the idle spectrum resource, information on a coverage edge of a primary user corresponding to the idle spectrum resource, and interference already produced on the idle spectrum on the coverage edge of the primary user by any user equipment in the secondary system other than the secondary user equipment having recently joined the secondary system; and computing a maximal transmit power the secondary user equipment having recently joined the secondary system is allowed to have according to locational information of the secondary user equipment having recently joined the secondary system and a propagation model between the secondary user equipment having recently joined the secondary system and the coverage edge of the primary user.

10. The method according to claim 6, wherein the optimizing, by the reconfiguration managing node, a transmit power of a secondary user equipment comprises:

adjusting, by the reconfiguration managing node based on a change in the transmit power of any secondary user equipment in the secondary system, the transmit power for the any secondary user equipment within the range of the overall interference the secondary system is allowed to produce.

11. An interference allocating system, comprising a reconfiguration managing node and a secondary user equipment under management of the reconfiguration managing node, the reconfiguration managing node being located in a secondary system, wherein the reconfiguration managing node is configured for:
acquiring or receiving information on an idle spectrum resource, and information on an overall interference the secondary system is allowed to produce on the idle spectrum resource; and computing, according to the information on the overall interference the secondary system is allowed to produce, a transmit power for the secondary user equipment under management of the reconfiguration managing node, wherein the system further comprises a database configured for storing primary user spectrum resource usage information, wherein the reconfiguration managing node is further configured for: acquiring or receiving, from the database, the information on the idle spectrum resource and the information on the overall interference the secondary system is allowed to produce on the idle spectrum resource, wherein the information on the idle spectrum resource comprises information on an idle spectrum resource of a primary user allowed to be configured for the secondary system within the range of idle spectrum resources expected to be configured for the secondary system, comprising at least one of:

a frequency, a bandwidth, an idle duration, coverage edge information, protection band information, an interference tolerance threshold, wherein the database is configured for:

computing, according to the interference tolerance threshold of the primary user on the idle spectrum resource and an interference already produced on the coverage edge of the primary user, a further interference tolerable to the primary user; or allocating, according to the interference tolerance threshold of the primary user and/or the further interference tolerable to the primary user, and according to the nature of any secondary system, an overall interference the any secondary system is allowed to produce, wherein the overall interference the any secondary system is allowed to produce accumulates to give the further interference tolerable to the primary user.

12. The system according to claim 11, wherein the database is further configured for: obtaining, by computing the overall interference on the idle spectrum resource allocated to any secondary system, the interference already produced; or obtaining, from feedback on an actual interference produced by a secondary system, the interference already produced; or obtaining, by sensing and measuring an actual interference on the idle spectrum resource, the interference already produced, wherein the nature of a secondary system comprises at least one of: historical interference information, payment information, priority information, and a transmit parameter requirement of the secondary system, the database is configured for allocating, according to the interference tolerance threshold of the primary user and/or the further interference tolerable to the primary user, and according to the nature of any secondary system, an overall interference the any secondary system is allowed to produce by:

allocating, according to the transmit parameter requirement and/or the priority information and/or the payment information and/or the historical interference information of any secondary system, an interference weight to the any secondary system by: allocating a large interference weight to a secondary system with a large transmit parameter requirement and/or a high priority level and/or a high fee payment and/or a small historical interference to allow the secondary system to produce a large interference, and allocating a small interference weight to a secondary system with a small transmit parameter requirement and/or a low priority level and/or a low fee payment and/or a large historical interference to allow the secondary system to produce a small interference; and obtaining the overall interference the any secondary system is allowed to produce by determining, according to the interference weight, a ratio of the overall interference the any secondary system is allowed to produce to the interference tolerance threshold of the primary user and/or the further interference tolerable to the primary user, wherein the reconfiguration managing node is configured for computing, according to the information on the overall interference the secondary system is allowed to produce, a transmit power for a secondary user equipment under management, by:

when an interference on the coverage edge of the primary user produced by the secondary user equipment reaches the overall interference, computing the transmit power of the secondary user equipment as a maximal transmit power the secondary user equipment is allowed to have according to location coordinates of the secondary user equipment under management, location coordinates of the coverage edge of the primary user, and a propagation model; or when multiple secondary user equipment under management of the reconfiguration managing node simultaneously use the idle spectrum resource, and an interference on the coverage edge of the primary user produced by the multiple secondary user equipment working simultaneously reaches the overall interference, computing a transmit power of each of the multiple secondary user equipment.

13. The system according to claim 11, wherein the reconfiguration managing node is configured for computing, according to the information on the overall interference the secondary system is allowed to produce, a transmit power for a secondary user equipment under management, by:

adjusting, according to the change in the overall interference the secondary system is allowed to produce, a transmit power of a secondary user equipment under management; or determining a transmit power for a secondary user equipment having recently joined the secondary system; or optimizing a transmit power of a secondary user equipment.

14. A database, configured for storing primary user spectrum resource usage information, and providing, to a reconfiguration managing node of a secondary system, information on an idle spectrum resource and information on an overall interference the secondary system is allowed to produce on the idle spectrum resource, such that the reconfiguration managing node computes, according to the information on the overall interference the secondary system is allowed to produce, a transmit power for a secondary user equipment under management of the reconfiguration managing node, wherein the information on the idle spectrum resource comprises information on an idle spectrum resource of a primary user allowed to be configured for the secondary system within the range of idle spectrum resources expected to be configured for the secondary system, comprising at least one of:

a frequency, a bandwidth, an idle duration, coverage edge information, protection band information, an interference tolerance threshold, wherein the database is further configured for:

computing, according to the interference tolerance threshold of the primary user on the idle spectrum resource and an interference already produced on the coverage edge of the primary user, a further interference tolerable to the primary user; or allocating, according to the interference tolerance threshold of the primary user and/or the further interference tolerable to the primary user, and according to the nature of any secondary system, an overall interference the any secondary system is allowed to produce, wherein the overall interference the any secondary system is allowed to produce accumulates to give the further interference tolerable to the primary user.

15. A managing node, located in a secondary system, the managing node comprising an acquiring module and a computing module, wherein the acquiring module is configured for: acquiring or receiving information on an idle spectrum resource, and information on an overall interference the secondary system is allowed to produce on the idle spectrum resource; and the computing module is configured for: computing, according to the information on the overall interference the secondary system is allowed to produce, a transmit power for a secondary user equipment under management of the reconfiguration managing node, wherein the acquiring module is configured for: acquiring or receiving, from a database configured for storing primary user spectrum resource usage information, the information on the idle spectrum resource and the information on the overall interference the secondary system is allowed to produce on the idle spectrum resource, wherein the information on the idle spectrum resource comprises information on an idle spectrum resource of a primary user allowed to be configured for the secondary system within the range of idle spectrum resources expected to be configured for the secondary system, comprising at least one of:

a frequency, a bandwidth, an idle duration, coverage edge information, protection band information, an interference tolerance threshold, wherein the database computes, according to the interference tolerance threshold of the primary user on the idle spectrum resource and an interference already produced on the coverage edge of the primary user, a further interference tolerable to the primary user; or the database allocates, according to the interference tolerance threshold of the primary user and/or the further interference tolerable to the primary user, and according to the nature of any secondary system, an overall interference the any secondary system is allowed to produce, wherein the overall interference the any secondary system is allowed to produce accumulates to give the further interference tolerable to the primary user.

16. A non-transitory computer storage medium, storing computer-executable instructions for executing an interference allocating method, the method comprising:

acquiring or receiving, by a reconfiguration managing node of a secondary system, information on an idle spectrum resource, and information on an overall interference the secondary system is allowed to produce on the idle spectrum resource; and computing, by the reconfiguration managing node according to the information on the overall interference the secondary system is allowed to produce, a transmit power for a secondary user equipment under management of the reconfiguration managing node, wherein the acquiring or receiving, by the reconfiguration managing node, the information on the idle spectrum resource and the information on the overall interference the secondary system is allowed to produce on the idle spectrum resource comprises:

acquiring or receiving, by the reconfiguration managing node from a database configured for storing primary user spectrum resource usage information, the information on the idle spectrum resource and the information on the overall interference the secondary system is allowed to produce on the idle spectrum resource, wherein the information on the idle spectrum resource comprises information on an idle spectrum resource of a primary user allowed to be configured for the secondary system within the range of idle spectrum resources expected to be configured for the secondary system, comprising at least one of:

a frequency, a bandwidth, an idle duration, coverage edge information, protection band information, an interference tolerance threshold, wherein the method further comprises:

computing, by the database according to the interference tolerance threshold of the primary user on the idle spectrum resource and an interference already produced on the coverage edge of the primary user, a further interference tolerable to the primary user; or allocating, by the database according to the interference tolerance threshold of the primary user and/or the further interference tolerable to the primary user, and according to the nature of any secondary system, an overall interference the any secondary system is allowed to produce, wherein the overall interference the any secondary system is allowed to produce accumulates to give the further interference tolerable to the primary user.

* * * * *